United States Patent
Taya et al.

(10) Patent No.: US 10,908,711 B2
(45) Date of Patent: Feb. 2, 2021

(54) WRITING SHEET FOR TOUCH PANEL PEN, TOUCH PANEL, TOUCH PANEL SYSTEM, DISPLAY DEVICE, AND METHOD FOR SELECTING WRITING SHEET FOR TOUCH PANEL PEN

(71) Applicant: DAI NIPPON PRINTING CO., LTD., Tokyo (JP)

(72) Inventors: Shubou Taya, Okayama (JP); Ryohei Miyata, Okayama (JP); Kentaro Hata, Okayama (JP); Masayuki Tsunekawa, Okayama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/788,810

(22) Filed: Feb. 12, 2020

(65) Prior Publication Data

US 2020/0183509 A1    Jun. 11, 2020

Related U.S. Application Data

(62) Division of application No. 16/060,303, filed as application No. PCT/JP2016/086069 on Dec. 5, 2016, now Pat. No. 10,732,733.

(30) Foreign Application Priority Data

Dec. 7, 2015 (JP) ................................ 2015-238525
Apr. 7, 2016 (JP) ................................ 2016-077363

(51) Int. Cl.
*G06F 3/041* (2006.01)
*G06F 3/0354* (2013.01)
(Continued)

(52) U.S. Cl.
CPC ........... *G06F 3/03545* (2013.01); *B32B 7/00* (2013.01); *G06F 1/1626* (2013.01);
(Continued)

(58) Field of Classification Search
None
See application file for complete search history.

(56) References Cited

U.S. PATENT DOCUMENTS 7,060,320 B1 * 6/2006 Omote ................. C01G 19/006
427/108
2002/0142133 A1 * 10/2002 Matsunaga ...... B29D 11/00798
428/141
(Continued)

FOREIGN PATENT DOCUMENTS

CN    101002139    7/2007
CN    104641326    5/2015
(Continued)

OTHER PUBLICATIONS

International Search Report issued for International Patent Application No. PCT/JP2016/086069, dated Jan. 31, 2017, 3 pages including English translation.

*Primary Examiner* — Carl Adams
(74) *Attorney, Agent, or Firm* — Hamre, Schumann, Mueller & Larson, P.C.

(57) ABSTRACT

It is intended to provide a writing sheet for a touch panel pen which can offer favorable writing feeling. The present invention provides a writing sheet for a touch panel pen (A) given below, the writing sheet having a surface whose maximum peak height Rp of a roughness curve and maximum valley depth Rv of the roughness curve defined in JIS B0601: 2001 satisfy the following conditions (A1) and (A2), and whose average wavelength $\lambda a$ calculated according to the following expression (i) from average tilt angle $\theta a$ and arithmetic average roughness Ra defined in JIS B0601: 2001

(Continued)

satisfies the following condition (A3): 2.0 μm≤Rp≤8.0 μm (A1), 0.8 μm≤Rv≤6.0 μm (A2), 45 μm≤λa≤300 μm (A3), and λa=2π×(Ra/tan(θa)) (i), <touch panel pen (A)> the touch panel pen having an angled part in at least a portion of a tip region, wherein a volumetric change of the tip region upon application of a vertical load of 100 gf is 1.0% or less.

6 Claims, 6 Drawing Sheets

(51) Int. Cl.
    *B32B 7/00*     (2019.01)
    *G06F 1/16*     (2006.01)
    *G06F 3/01*     (2006.01)
    *G06F 3/044*     (2006.01)
    *G06F 3/045*     (2006.01)

(52) U.S. Cl.
    CPC ............ *G06F 1/1643* (2013.01); *G06F 3/017* (2013.01); *G06F 3/041* (2013.01); *G06F 3/0414* (2013.01); *G06F 3/044* (2013.01); *G06F 3/045* (2013.01); *G06F 2200/1633* (2013.01); *G06F 2203/04103* (2013.01)

(56) References Cited

U.S. PATENT DOCUMENTS

| | | | |
|---|---|---|---|
| 2009/0002817 | A1 | 1/2009 | Harada et al. |
| 2009/0284475 | A1* | 11/2009 | Nashiki ................... G06F 3/045 345/173 |
| 2012/0262646 | A1 | 10/2012 | Iwata et al. |
| 2014/0202531 | A1 | 7/2014 | Oya et al. |
| 2014/0377704 | A1 | 12/2014 | Mukai et al. |
| 2015/0049440 | A1 | 2/2015 | Hara et al. |
| 2015/0177899 | A1 | 6/2015 | Degner et al. |
| 2016/0357102 | A1 | 12/2016 | Muka et al. |
| 2018/0364822 | A1* | 12/2018 | Taya ....................... B32B 27/26 |

FOREIGN PATENT DOCUMENTS

| | | |
|---|---|---|
| JP | 2010070445 | 4/2010 |
| JP | 2014109712 | 6/2014 |
| JP | 2014137640 | 7/2014 |
| JP | 2015035195 | 2/2015 |
| JP | 2015114939 | 6/2015 |
| TW | 201324538 | 6/2013 |
| TW | 201337677 | 9/2013 |

\* cited by examiner (Coefficient of friction)

(a)  (b)

WRITING SHEET FOR TOUCH PANEL PEN, TOUCH PANEL, TOUCH PANEL SYSTEM, DISPLAY DEVICE, AND METHOD FOR SELECTING WRITING SHEET FOR TOUCH PANEL PEN

TECHNICAL FIELD

The present invention relates to a writing sheet for a touch panel pen, a touch panel, a touch panel system, a display device, and a method for selecting a writing sheet for a touch panel pen.

BACKGROUND ART

In recent years, the distribution of touch panels has been increasing, partly because the touch panels are installed in many handheld terminals. Surface protective sheets may be attached to the surfaces of the touch panels for various purposes.

Resistive touch panels, which have previously been mainstream, are repetitively tapped with fingers or a pen to operate. Therefore, their surface protective sheets are required to have a high level of scratch resistance.

On the other hand, the surface protective sheets for capacitive touch panels, which are currently mainstream, are required to have slipperiness for operating the capacitive touch panels with fingers. Since the conventional resistive touch panels cannot sense a plurality of locations at the same time, fingers are not moved on their screens. By contrast, the capacitive touch panels are capable of sensing a plurality of locations at the same time and thus often undergo operation based on movement with fingers on their screens.

The surface protective sheets for touch panels are required to have the capability of preventing fingerprint smudge upon operation with fingers or facilitating wiping off such fingerprint smudge, in common between the resistive and capacitive touch panels.

The surface protective sheets for touch panels as described above have been proposed in, for example, PTL1 and PTL2.

CITATION LIST

Patent Literature

PTL1: JP 2015-114939 A
PTL2: JP 2014-109712 A

SUMMARY OF INVENTION

Technical Problem

Capacitive touch panels recognize a touched location by measuring change in capacitance. Therefore, touching objects need to have a given conductivity. Hence, in the early days of appearance of the capacitive touch panels, only operability with fingers has been studied, and writability to draw characters or pictures with touch panel pens, for example, has not been studied. For resistive touch panels as well, the operation using touch panel pens is typically tapping, and writability to draw characters or pictures has not been emphasized.

However, in recent years, touch panel pens capable of entry in capacitive touch panels or electromagnetic touch panels have started to be proposed, and an increasing number of applications have responded to character entry or drawing with touch panel pens. For these reasons, surface protective sheets for touch panels are required to offer favorable writing feeling with touch panel pens.

However, the conventional surface protective sheets for touch panels proposed in PTL1 and PTL2 have made no discussion about writing feeling with touch panel pens. In addition, there has been a demand in recent years for a high level of writing feeling comparable to pencil writing on paper.

An object of the present invention is to provide a writing sheet for a touch panel pen, a touch panel, a touch panel system, and a display device which can offer favorable writing feeling, and a method for selecting a writing sheet for a touch panel pen.

Solution to Problem

To attain the object, the present invention provides a writing sheet for a touch panel pen, a touch panel, a touch panel system, a display device, and a method for selecting a writing sheet for a touch panel pen in the following [1] to [9]:

[1] A writing sheet for a touch panel pen (A) given below, the writing sheet having a surface whose maximum peak height Rp of a roughness curve and maximum valley depth Rv of the roughness curve defined in JIS B0601: 2001 satisfy the following conditions (A1) and (A2), and whose average wavelength λa calculated according to the following expression (i) from average tilt angle θa and arithmetic average roughness Ra defined in JIS B0601: 2001 satisfies the following condition (A3):

$$2.0 \; \mu m \leq Rp \leq 8.0 \; \mu m \quad (A1),$$

$$0.8 \; \mu m \leq Rv \leq 6.0 \; \mu m \quad (A2),$$

$$45 \; \mu m \leq \lambda a \leq 300 \; \mu m \quad (A3), \text{ and}$$

$$\lambda a = 2\pi \times (Ra/\tan(\theta a)) \quad (i),$$

<Touch Panel Pen (A)>
the touch panel pen having an angled part in at least a portion of a tip region, wherein a volumetric change of the tip region upon application of a vertical load of 100 gf is 1.0% or less.

[2] A touch panel comprising a sheet on a surface, wherein a writing sheet for a touch panel pen according to [1] is placed as the sheet such that the side that satisfies the conditions (A1) to (A3) faces the surface of the touch panel.

[3] A display device comprising a touch panel, wherein the touch panel is a touch panel according to [2].

[4] A method for selecting a writing sheet for a touch panel pen, comprising selecting a sheet having a surface whose maximum peak height Rp of a roughness curve and maximum valley depth Rv of the roughness curve defined in JIS B0601: 2001 satisfy the conditions (A1) and (A2), and whose average wavelength λa calculated according to the expression (i) from average tilt angle θa and arithmetic average roughness Ra defined in JIS B0601: 2001 satisfies the condition (A3), as the writing sheet for the touch panel pen (A).

[5] A method for selecting a writing sheet for a touch panel pen, comprising selecting a sheet that satisfies the following conditions (B1) and (B2), as the writing sheet for a touch panel pen:
<Condition (B1)>
the touch panel pen is fixed in contact at an angle of 60 degrees with the surface of the writing sheet for a touch panel pen; while a vertical load of 100 gf is applied to the touch panel pen, the writing sheet for a touch panel pen is moved 40 mm in one-way length at a rate of 14 mm/sec; friction force on the touch panel pen in the direction of the movement is measured at 0.001-second intervals to calculate kinetic friction force $F_k$; and when a standard deviation of the $F_k$ is calculated, the standard deviation is 3.0 gf or more and 11.0 gf or less; and
<Condition (B2)>
after the completion of the movement of 40 mm in one-way length of the writing sheet for a touch panel pen under the condition (B1), the vertical load of 100 gf applied to the touch panel pen is maintained, and the touch panel pen is kept in contact at an angle of 60 degrees with the surface of the writing sheet for a touch panel pen; in this state, friction force on the touch panel pen in the direction of the movement is regarded as residual friction force $F_{re}$; and when the $F_{re}$ is measured at 0.001 second-intervals, the $F_{re}$ is 4.5 gf or more and 15.0 gf or less on average.

[6] A touch panel system comprising: a touch panel comprising a writing sheet for a touch panel pen on a surface; and a touch panel pen, wherein the touch panel system satisfies the conditions (B1) and (B2).

[7] A writing sheet for a touch panel pen having a surface that satisfies the conditions (B1) and (B2).

[8] A touch panel comprising a sheet on a surface, wherein a writing sheet for a touch panel pen according to [7] is placed as the sheet such that the side that satisfies the conditions (B1) and (B2) faces the surface of the touch panel.

[9] A display device with a touch panel, the display device comprising the touch panel on a display element, wherein the touch panel is a touch panel according to [8].

Advantageous Effects of Invention

The writing sheet for a touch panel pen, the touch panel, the touch panel system and the display device of the present invention can offer favorable writing feeling. Also, the method for selecting a writing sheet for a touch panel pen according to the present invention can select a writing sheet that offers favorable writing feeling even without a writing test using the touch panel pen. Thus, efficient product design and quality control of writing sheets can be achieved.

BRIEF DESCRIPTION OF DRAWINGS

FIG. 4 is a diagram illustrating a method for calculating average tilt angle θa.

DESCRIPTION OF EMBODIMENTS

Embodiment A

[Writing Sheet for Touch Panel Pen]
The writing sheet for a touch panel pen of embodiment A is a writing sheet for a touch panel pen (A) given below, the writing sheet having a surface whose maximum peak height Rp of a roughness curve and maximum valley depth Rv of the roughness curve defined in JIS B0601: 2001 satisfy the following conditions (A1) and (A2), and whose average wavelength λa calculated according to the following expression (i) from average tilt angle θa and arithmetic average roughness Ra defined in JIS B0601: 2001 satisfies the following condition (A3):

$$2.0\ \mu m \leq Rp \leq 8.0\ \mu m \quad (A1),$$

$$0.8\ \mu m \leq Rv \leq 6.0\ \mu m \quad (A2),$$

$$45\ \mu m \leq \lambda a \leq 300\ \mu m \quad (A3), \text{and}$$

$$\lambda a = 2\pi \times (Ra/\tan(\theta a)) \quad (i),$$

<Touch Panel Pen (A)>
the touch panel pen having an angled part in at least a portion of a tip region, wherein a volumetric change of the tip region upon application of a vertical load of 100 gf is 1.0% or less.

Figure 1:
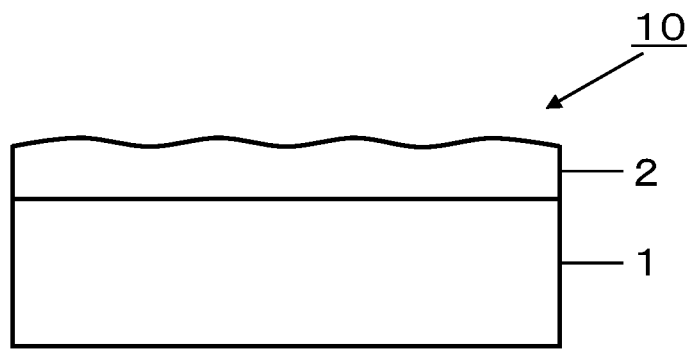
FIG. 1 is a cross-sectional view showing one embodiment of the writing sheet for a touch panel pen of the present invention.

FIG. 1 is a cross-sectional view showing one embodiment of writing sheet 10 for a touch panel pen of embodiment A. The writing sheet 10 for a touch panel pen shown in FIG. 1 has resin layer 2 on one side of plastic film 1. Writing sheet 10 for a touch panel pen shown in FIG. 2 has a single-layer structure of resin layer 2.

In the writing sheet for a touch panel pen of embodiment A, one of the surfaces may satisfy the conditions (A1) to (A3), or both the surfaces may satisfy the conditions (A1) to (A3).

The writing sheet for a touch panel pen of embodiment A may be in a sheet-like form or may be a long sheet coiled in a roll form.

Hereinafter, the writing sheet for a touch panel pen is also referred to as a "writing sheet". Hereinafter, the surface that satisfies the conditions (A1) to (A3) is also referred to as a "writing surface". Hereinafter, a high level of writing feeling comparable to pencil writing on paper is also referred to as "pencil-like writing feeling".

The writing sheet for a touch panel pen of embodiment A can produce pencil-like writing feeling with a touch panel pen (A) provided that at least one of the surfaces satisfies the conditions (A1) to (A3). Hereinafter, the technical idea of the design of the touch panel pen (A) and the conditions (A1) to (A3) will be described.

In order to obtain pencil-like writing feeling, it is conceivable to provide the writing sheet with a surface shape similar to that of paper. However, paper has severe surface asperities. Therefore, a writing sheet provided with a surface shape similar to that of paper is remarkably become white muddiness, so that information such as characters located under the writing sheet may be difficult to recognize. The resulting writing sheet is less likely to effectively function as a writing sheet for a touch panel. Thus, the surface shape of the writing sheet cannot have excessive asperities.

The writing feeling is probably influenced largely by resistance (coefficient of kinetic friction) generated when the tip region of a touch panel pen climbs over the surface asperities of the writing sheet. A low coefficient of kinetic friction makes a writing feel slippery and cannot produce pencil-like writing feeling. In other words, a predetermined level of a coefficient of kinetic friction is probably important for obtaining pencil-like writing feeling.

Figure 3:
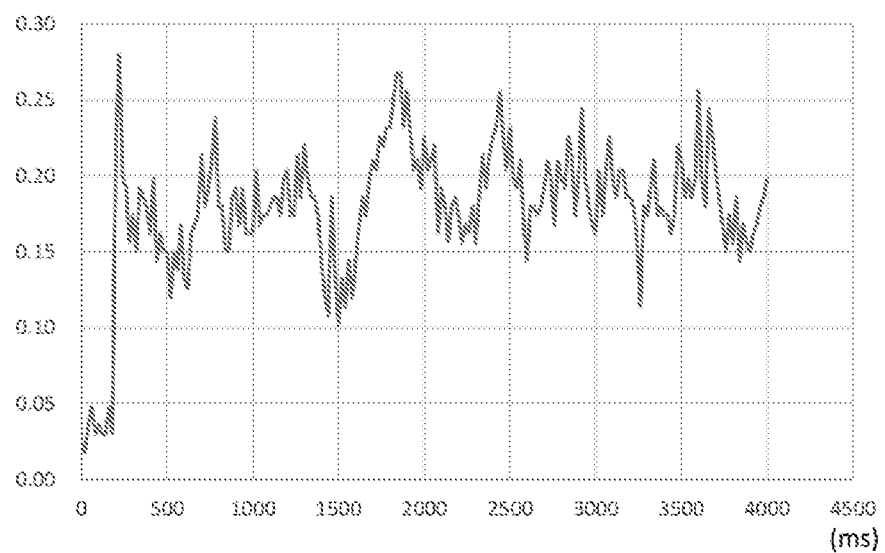
FIG. 3 is a diagram showing one example of time-dependent change in coefficient of friction upon pencil writing on paper.

Even given the predetermined coefficient of kinetic friction, persons still perceive a slippery feel in the absence of change in coefficient of kinetic friction. FIG. 3 shows one example of a coefficient of friction at each point in time (every 20 ms) upon pencil writing on paper. The ordinate of FIG. 3 depicts the coefficient of friction, and the abscissa thereof depicts the time (ms). The coefficient of friction at or after 400 ms is regarded as the coefficient of kinetic friction because initial values of the measurement are not stable. As seen from FIG. 3, the coefficient of kinetic friction is largely changed at each point in time upon pencil writing on paper. Thus, change in coefficient of kinetic friction is probably also important for obtaining pencil-like writing feeling. The measurement conditions for the coefficient of friction shown in FIG. 3 involve a load of 50 gf and a writing rate of 50 mm/s.

The present inventors have conducted diligent studies on a configuration for obtaining pencil-like writing feeling even if the surface shape of the writing sheet is not provided with excessive asperities. As a result, the present inventors have focused on achieving the configuration for obtaining pencil-like writing feeling by the combination of the writing sheet with a touch panel pen, not by the writing sheet alone.

For general-purpose touch panel pens, the tip regions of the pens are provided with a smooth shape, or a soft and deformable raw material is used as a raw material constituting the tip regions of the pens, in order to prevent flaws in writing sheets. The present inventors have conducted diligent studies on the shape and raw material of the tip region of a pen and consequently found that a "touch panel pen whose tip region has an angled part, is not smooth, and is difficult to deform", which is contrary to the concept of the general-purpose touch panel pens, is effective for pencil-like writing feeling.

The pen having an angled part in the tip region can increase the coefficient of kinetic friction because the tip region of the pen is more likely to get caught on the surface asperities of the writing sheet as compared with a pen having a smooth tip region without an angled part. If the pen having an angled part in the tip region contains a soft and deformable raw material as a raw material constituting the tip region, the coefficient of kinetic friction is not increased because the tip region of the pen is deformed due to writing pressure and thereby becomes less likely to get caught on the surface asperities of the writing sheet. In other words, the touch panel pen whose tip region has an angled part and is difficult to deform can increase the coefficient of kinetic friction. Furthermore, use of the touch panel pen can achieve an "increased coefficient of kinetic friction" which is a condition for obtaining pencil-like writing feeling, even without causing the surface shape of the writing sheet to have excessive asperities.

The present inventors have further conducted studies and consequently found that change in coefficient of kinetic friction is obtained while a proper coefficient of kinetic friction is obtained provided that the writing sheet has a surface that satisfies the conditions (A1) to (A3).

Condition (A1)

The condition (A1) requires maximum peak height Rp of a roughness curve defined in JIS B0601: 2001 to satisfy $2.0\ \mu m \leq Rp \leq 8.0\ \mu m$.

If Rp is less than 2.0 μm, the resulting writing sheet cannot provide a coefficient of kinetic friction generated in climbing over the peaks of surface asperities, and cannot produce pencil-like writing feeling. If Rp exceeds 8.0 μm, information such as characters located under the writing sheet may be difficult to recognize due to too excessive asperities.

For the condition (A1), it is preferred to satisfy $2.5\ \mu m \leq Rp \leq 7.0\ \mu m$, more preferably $4.0\ \mu m \leq Rp \leq 6.0\ \mu m$.

The cutoff value of the condition (A1) and conditions (A2) to (A5) mentioned later is 0.8 mm.

The parameters of the conditions (A1) to (A5) are set to average values from 20 samples each measured once. Also, a haze mentioned later is set to an average value from 20 samples each measured once.

Condition (A2)

The condition (A2) requires maximum valley depth Rv of the roughness curve defined in JIS B0601: 2001 to satisfy $0.8\ \mu m \leq Rv \leq 6.0\ \mu m$.

If Rv is less than 0.8 μm, the resulting writing sheet cannot provide a coefficient of kinetic friction generated in climbing up the valleys of surface asperities, and cannot produce pencil-like writing feeling. If Rv exceeds 6.0 μm, information such as characters located under the writing sheet may be difficult to recognize due to too excessive asperities.

For the condition (A2), it is preferred to satisfy $1.0\ \mu m \leq Rv \leq 5.0\ \mu m$, more preferably $2.5\ \mu m \leq Rp \leq 4.0\ \mu m$.

Condition (A3)

The condition (A3) requires average wavelength λa calculated according to the following expression (i) from average tilt angle θa and arithmetic average roughness Ra defined in JIS B0601: 2001 to satisfy $45\ \mu m \leq \lambda a \leq 300\ \mu m$:

$$\lambda a = 2\pi \times (Ra/\tan(\theta a)) \quad (i)$$

λa of less than 45 μm means a shorter average wavelength of the asperities. Therefore, if λa is less than 45 μm, the tip of a touch panel pen constantly comes into contact with the apices of the surface convex parts of the writing sheet so that the influence of the surface asperities of the writing sheet is reduced, and thereby decrease the coefficient of kinetic friction. λa exceeding 300 μm means a longer average wavelength of the asperities. In this case, the tip of the touch panel pen, albeit capable of entering into between the convex parts, comes into contact with the convex parts with reduced frequency due to too wide a distance between the convex parts, and thereby decrease the coefficient of kinetic friction.

For the condition (A3), it is preferred to satisfy $100\ \mu m \leq \lambda a \leq 275\ \mu m$, more preferably $200\ \mu m \leq \lambda a \leq 250\ \mu m$.

Figure 4:
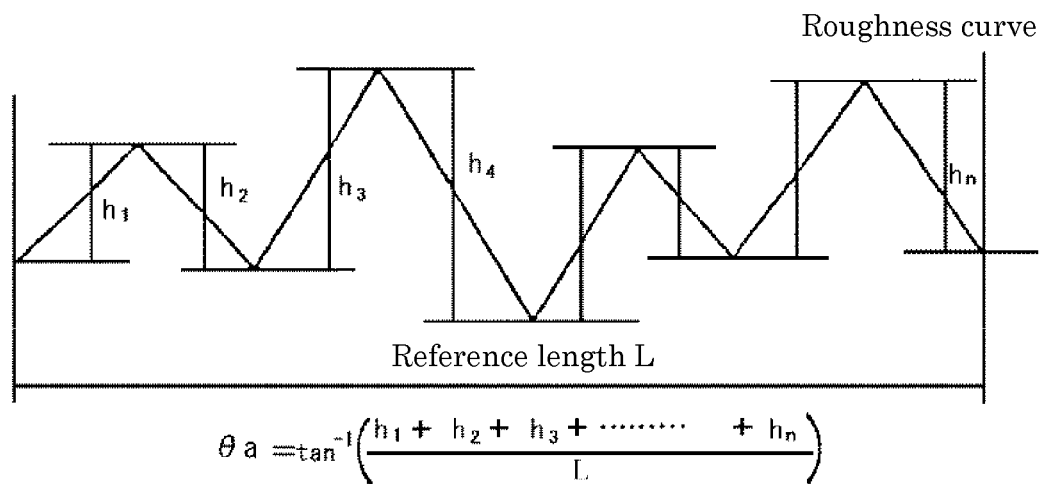
Figure 5:
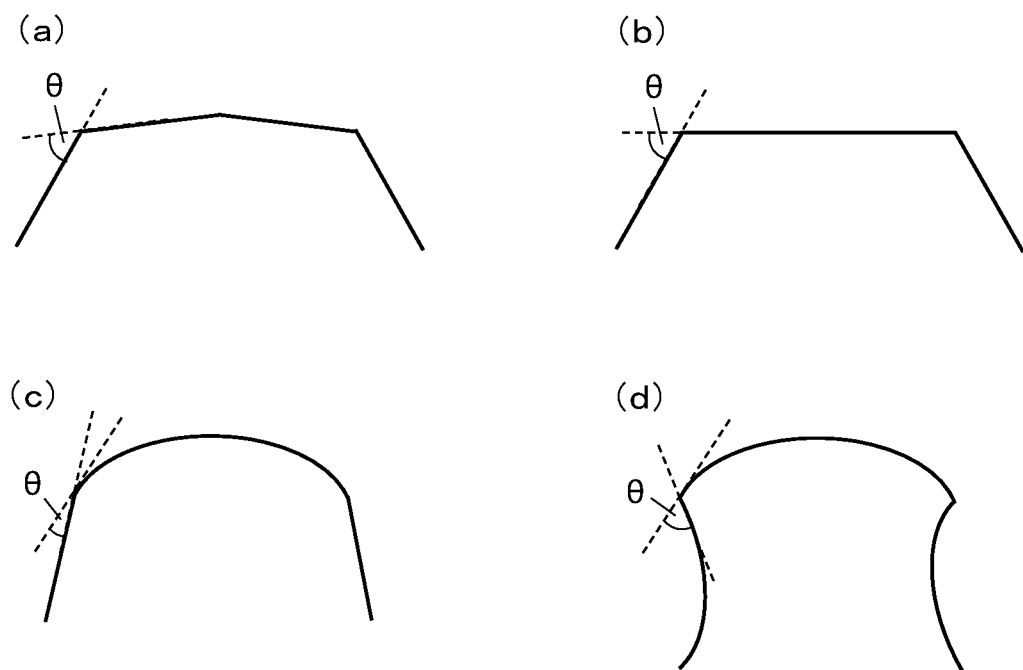
FIG. 5 is a cross-sectional view showing an embodiment of a tip region of a touch panel pen (A).

The average tilt angle θa is a value defined in the manual (revised on 1995 Jul. 20) of a surface roughness tester (trade name: SE-3400) manufactured by Kosaka Laboratory Ltd. and can be determined according to an arc tangent of the sum of projection heights $(h_1+h_2+h_3+ \ldots +h_n)$ present at reference length L, i.e., $\theta a=\tan^{-1}\{(h_1+h_2+h_3+ \ldots +h_n)/L\}$, as shown in FIG. 4.

θa can be calculated according to the following expression (A):

[Formula 1]

$$\theta a = \frac{1}{L}\int_0^L |dy/dx|dx \quad (A)$$

wherein "L" represents the reference length, and "dy/dx" represents the slope of each unit segment of the roughness curve.

The "reference length" means a "cutoff value". In short, when the cutoff value is 0.8 mm, the reference length is 0.8 mm. The unit measuring segment is a segment of a length determined by dividing the cutoff value by the number of samples. The number of samples is set to 1500.

<Touch Panel Pen (A)>

The writing sheet of embodiment A can be used as a writing sheet for a touch panel pen having an angled part in at least a portion of a tip region, wherein a volumetric change of the tip region upon application of a vertical load of 100 gf is 1.0% or less (touch panel pen (A)), to thereby offer favorable writing feeling.

As mentioned above, for general-purpose touch panel pens, the tip regions of the pens are provided with a smooth shape, or a soft and deformable raw material is used as a raw material constituting the tip regions of the pens, in order to prevent flaws in writing sheets. The writing sheet of embodiment A is intended for a "touch panel pen whose tip region has an angled part (tip region does not have a smooth shape) and is difficult to deform", which is different from the general-purpose touch panel pens.

The touch panel pen (A) which has an angled part in the tip region renders its tip region easily caught on the surface asperities of the writing sheet and can increase the coefficient of kinetic friction which is an important factor for obtaining pencil-like writing feeling. Furthermore, the touch panel pen (A) in which a volumetric change of the tip region upon application of a vertical load of 100 gf is 1.0% or less renders its tip region difficult to deform due to writing pressure and maintains the angled part of the tip region. Therefore, the touch panel pen (A) can increase the coefficient of kinetic friction which is an important factor for obtaining pencil-like writing feeling.

In the case of using a touch panel pen whose tip region does not have an angled part or a touch panel pen in which a volumetric change of the tip region upon application of a vertical load of 100 gf exceeds 1.0%, even a sheet that satisfies the conditions (A1) to (A3) cannot produce pencil-like writing feeling.

The tip region refers to a region within 1.5 mm from the nib of the touch panel pen.

In embodiment A, the phrase "tip region has an angled part" means that θmax determined by the following procedures (i) to (iv) is 15 degrees or more:
(i) a photograph is taken in a range including the tip region (region within 1.5 mm from the nib) of the touch panel pen;
(ii) length L of the outer perimeter of the tip region is calculated from the photograph;
(iii) the outer perimeter is divided into 1/300 of the length L to prepare points at 301 locations (n1 to n301); and
(iv) tangent lines to the outer perimeter are respectively drawn at the 301 locations, and an angle formed by the tangent lines at adjacent points is defined as θ while the maximum value of θ is defined as θmax.

Each of FIGS. 5(a) to 5(d) is a cross-sectional view showing an embodiment of the tip region of the touch panel pen (A). The dotted lines in FIG. 5 depict the tangent lines at arbitrary points.

It is preferred that the angled part should be formed in all directions of the touch panel pen (A).

θmax is preferably 15 degrees or more and 75 degrees or less, more preferably 20 degrees or more and 60 degrees or less.

In the touch panel pen (A), the volumetric change of the tip region upon application of a vertical load of 100 gf is 1.0% or less. The volumetric change of the touch panel pen can be calculated, for example, as follows:

First, a photograph is taken before the application of a load, and the area of the tip region without a load is calculated from the photograph. Next, the touch panel pen is placed in a vertical position on a glass plate having a thickness of 3 mm or larger. A photograph of the touch panel pen upon application of a vertical load of 100 gf is taken, and the area of the tip region under the load is calculated from the photograph. A value obtained by applying the obtained areas to the expression (ii) given below can be regarded as the volumetric change. It is preferred that the photographs should be taken from the vertical direction side with respect to the pen holder.

(Area of the tip region after the application of a load/Area of the tip region before the application of the load)×100 (ii)

In the touch panel pen (A), the volumetric change of the tip region upon application of a vertical load of 100 gf is preferably 0.1% or less.

For adjusting the volumetric change of the tip region upon application of a vertical load of 100 gf to 1.0% or less, it is preferred that the raw material constituting the tip region of the touch panel pen (A) should be composed mainly of a hard raw material. Specifically, it is preferred that the raw material constituting the tip region of the touch panel pen (A) should be composed mainly of a raw material having Young's modulus E exceeding 1.0 GPa. The Young's modulus of the raw material serving as a main component is more preferably 1.5 GPa or more, further preferably 1.8 GPa or more. The Young's modulus of the raw material is preferably 10.0 GPa or less from the viewpoint of suppressing surface flaws in the writing sheet. The term "main component" or "composed mainly" means 50% by mass or more, preferably 70% by mass or more, more preferably 90% by mass or more, with respect to the total solid content of raw materials constituting the tip region.

Examples of the raw material having Young's modulus E of 1.0 GPa or less include acrylonitrile and urethane. Examples of the raw material having Young's modulus E exceeding 1.0 GPa include ABS resin, polyacetal, melamine resin, nylon, and polyester resin.

The atmosphere for the measurement of the Young's modulus E involves a temperature of 23° C.±5° C. and a humidity of 50%±10%. Before the start of measurement of the Young's modulus E, a measurement sample is left in an atmosphere involving 23° C.±5° C. and a humidity of 50%±10% for 10 minutes or longer.

Diameter D of the nib of the touch panel pen (A) is preferably 0.3 to 6.0 mm, more preferably 0.4 to 2.0 mm.

Figure 6:
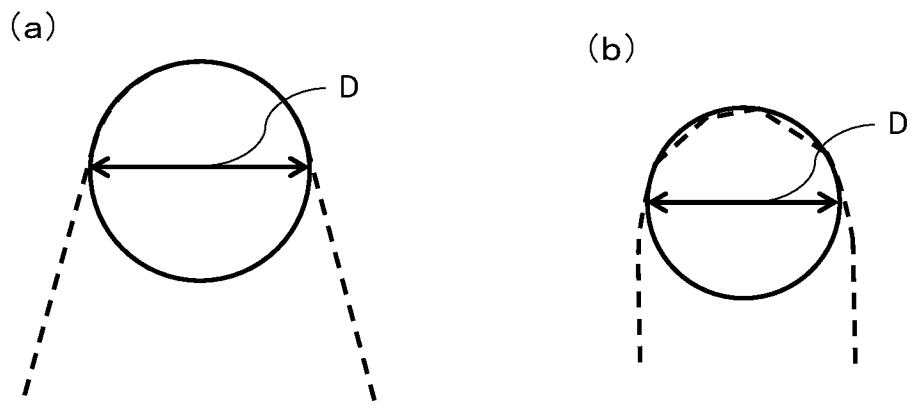
FIG. 6 is a diagram illustrating a method for calculating diameter D of a touch panel pen.

The diameter D of the nib is calculated with reference to a photograph of the touch panel pen taken from the vertical direction side with respect to the pen holder. In FIG. 6, the outside shape of the touch panel pen photographed from the vertical direction side with respect to the pen holder is indicated by a dotted line. As shown in FIG. 6(a), a circle is superimposed on the outside shape in the photograph such that the circle passes through the top of the outside shape and does not exceed the outside shape. In this respect, the diameter of the largest circle is defined as the diameter D of the nib. As shown in FIG. 6(b), however, if the outside shape in the photograph has an incline with an angle of 40 to 90 degrees with respect to the pen holder, the circle may be superimposed on the outside shape so as to exceed the incline.

<Other Suitable Conditions of Writing Sheet>

For the writing sheet of embodiment A, it is preferred that the arithmetic average roughness Ra of the surface defined in JIS B0601: 2001 should satisfy the following condition (A4):

$$0.3 \ \mu m \leq Ra \leq 2.5 \ \mu m \quad (A4)$$

When Ra is 0.3 µm or more, the resulting writing sheet easily provides a moderate coefficient of kinetic friction and can render pencil-like writing feeling more favorable. When Ra is 2.5 µm or less, information such as characters located under the writing sheet can be prevented from being difficult to recognize due to too excessive asperities.

For the condition (A4), it is more preferred to satisfy 0.7 µm≤Ra≤2.2 µm, further preferably 1.5 µm≤Ra≤1.8 µm.

For the writing sheet of embodiment A, it is preferred that maximum height of rolling circle waviness profile $W_{EM}$ of the surface defined in JIS B0610: 2001 should satisfy the following condition (A5):

$$4.0 \ \mu m \leq W_{EM} < 15.0 \ \mu m \quad (A5)$$

When $W_{EM}$ is 4.0 µm or more, the resulting writing sheet easily provides a moderate coefficient of kinetic friction and can render pencil-like writing feeling more favorable. When $W_{EM}$ is less than 15.0 µm, information such as characters located under the writing sheet can be prevented from being difficult to recognize due to too excessive asperities.

For the condition (A5), it is preferred to satisfy 5.0 µm≤$W_{EM}$<13.0 µm, more preferably 7.0 µm≤$W_{EM}$<12.0 µm.

$W_{EM}$ can be measured in conformity with JIS B0610: 2001. For the measurement, for example, 8 mm can be selected as a radius of the rolling circle, and, for example, 25 mm can be selected as a reference length.

For the writing sheet of embodiment A, the haze defined in JIS K7136: 2000 is preferably 15 to 75%, more preferably 20 to 50%.

When the haze is 15% or more, the resulting writing sheet can have favorable anti-glare properties and can have appearance similar to that of paper. When the haze is 60% or less, information such as characters located under the writing sheet can be prevented from being difficult to recognize.

For the haze measurement, light is incident on a surface opposite to the writing surface of the writing sheet. When both the surfaces of the writing sheet satisfy the conditions (A1) to (A3), the surface of light incidence may be either of the surfaces.

For the writing sheet of embodiment A, the pencil hardness defined in JIS K5600-5-4: 1999 is preferably H to 9H, more preferably 3H to 6H, on the side that satisfies the conditions (A1) to (A3).

The touch panel pen (A) has an angled part in the tip region, and the tip region is difficult to deform. Therefore, the touch panel pen (A) is more likely to cause flaws in the writing sheet as compared with general-purpose touch panel pens. When the pencil hardness of the writing sheet is H or more, the resulting writing sheet can suppress surface flaws upon writing with the touch panel pen (A). When the pencil hardness of the writing sheet is 9H or less, the resulting writing sheet can have favorable handleability. In addition, the life of the nib is extended.

For the writing sheet of embodiment A, the touch panel pen (A) is fixed in contact at an angle of 60 degrees with the writing surface; while a vertical load of 50 gf is applied to the touch panel pen (A), the writing sheet is moved 40 mm in one-way length at a rate of 14 mm/sec; and when a coefficient of kinetic friction on the touch panel pen (A) in the direction of the move is defined as µk and a coefficient of static friction is defined as µs, µk and µs preferably fall within the following ranges:

µk is preferably 0.08 to 0.30, more preferably 0.12 to 0.25; and µs is preferably 0.20 to 0.80, more preferably 0.25 to 0.60.

The coefficient µk of kinetic friction means an average coefficient of kinetic friction over the whole measurement time. The coefficient of static friction is the initial peak of friction force that has reached the coefficient of kinetic friction from friction force 0 over the measurement time. The measurement intervals of these coefficients of friction are preferably 0.02 seconds.

It is preferred that µk and µs should fall within the ranges described above even when the touch panel pen (A) is fixed in contact at an angle other than 60 degrees (e.g., any angle in the range of 30 to 75 degrees) with the writing surface. It is also preferred that µk and µs should fall within the ranges described above even when the moving rate is set to a rate other than 14 mm/sec (e.g., any rate in the range of 0.1 to 100 mm/sec).

Figure 7:
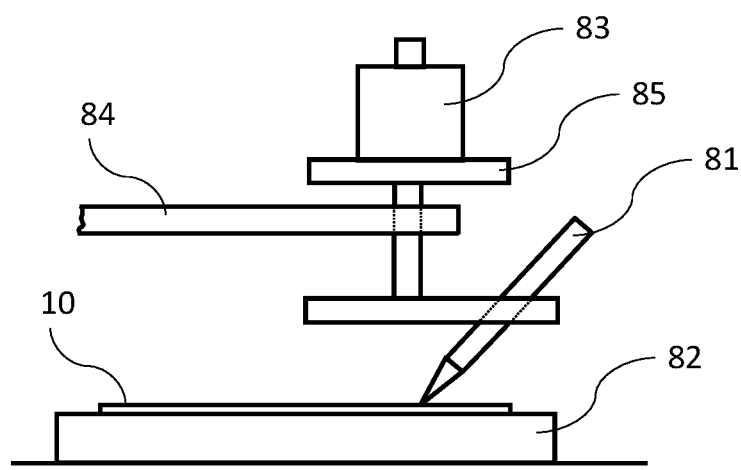
FIG. 7 is a diagrammatic view illustrating a method for measuring coefficients of friction.

FIG. 7 is a diagrammatic view illustrating a method for measuring µk and µs.

In FIG. 7, touch panel pen 81 is fixed in contact with writing sheet 10 by holding fixture 84. Base 85 for the placement of weight 83 thereon is attached to an upper part of the holding fixture 84. The weight 83 is placed on the base 85 and thereby applies a vertical load to the touch panel pen. The writing sheet 10 is fixed onto movable mount 82.

For the measurement of the coefficients of friction, the movable mount 82 is moved, at the predetermined rate to the obtuse direction side (left side of FIG. 7) of an angle formed by the movable mount and the touch panel pen, with the touch panel pen fixed as described above.

Examples of the apparatus capable of the measurement shown in FIG. 7 include HEIDON-14DR (trade name) manufactured by Shinto Scientific Co., Ltd.

<Overall Configuration of Writing Sheet>

The writing sheet for a touch panel pen of embodiment A is not particularly limited by its configuration as long as at least one of the surfaces satisfies the conditions (A1) to (A3).

Figure 2:
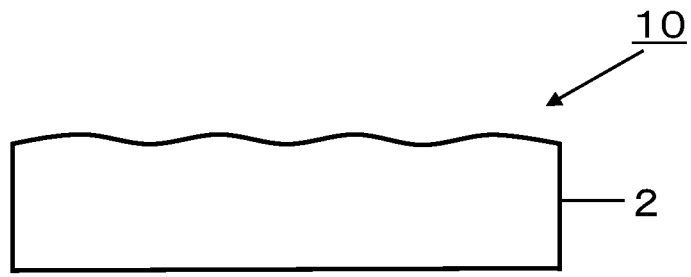
FIG. 2 is a cross-sectional view showing another embodiment of the writing sheet for a touch panel pen of the present invention.

Examples of the configuration of the writing sheet 10 for a touch panel pen of embodiment A include, as shown in FIGS. 1 and 2, a configuration having resin layer 2, wherein one of the surfaces of the resin layer 2 satisfies the conditions (A1) to (A3).

Although not shown, the writing sheet may have an additional layer other than the resin layer or the plastic film, and a surface of the additional layer may satisfy the conditions (A1) to (A3). Examples of the additional layer include antistatic layers and antifouling layers. Although not shown, the resin layer may be constituted by two or more layers.

The surface that satisfies the conditions (A1) to (A3) (writing surface) can be formed by (a) physical or chemical treatment such as embossing, sandblasting, or etching, (b) molding using a mold, (c) coating, etc. Among these methods, (b) molding using a mold is suitable from the viewpoint of the reproducibility of the surface shape, and (c) coating is suitable from the viewpoint of productivity and response to multi-itemed production.

The molding using a mold can involve preparing a mold having a shape complementary to the shape that satisfies the conditions (A1) to (A3), and charging a material forming the resin layer into the mold, followed by demolding to form the surface. In this context, the material used is a material constituting the resin layer. After the charging of the material into the mold, the plastic film is layered over the material, and the resin layer can be demolded together with the plastic film to obtain a writing sheet for a touch panel pen having the resin layer on the plastic film, wherein a surface of the resin layer satisfies the conditions (A1) to (A3). Alternatively, the resin layer may be demolded alone without the use of the plastic film, or the resin layer may be demolded together with the plastic film and then separated from the plastic film to obtain a writing sheet for a touch panel pen consisting of a single resin layer, wherein a surface of the resin layer satisfies the conditions (A1) to (A3).

In the case of using a curable resin composition (thermosetting resin composition or ionizing radiation-curable resin composition) as the material to be charged into the mold, it is preferred to cure the curable resin composition before demolding.

The formation of the resin layer by the coating can be performed by applying a resin layer-forming application liquid containing a resin component, particles and a solvent onto the plastic film by an application method known in the art such as gravure coating or bar coating, followed by drying and curing.

For satisfying the conditions (A1) to (A3) mentioned above by the surface shape of the resin layer formed by the coating, it is preferred to set the average particle size of the particles, the content of the particles, and the film thickness of the resin layer to ranges mentioned later and also to control the aggregation of the particles by way of the solvent and drying conditions.

The film thickness of the resin layer is preferably 1.5 to 10 μm, more preferably 2 to 6 μm. The film thickness of the resin layer can be calculated, for example, from an average value of thicknesses at 20 locations measured from a cross-sectional image taken using a transmission electron microscope (TEM) or a scanning transmission electron microscope (STEM). The accelerating voltage of TEM or STEM is preferably 10 to 30 kV, and the magnification is preferably ×50000 to ×300000.

Any of organic particles and inorganic particles can be used as the particles of the resin layer. Examples of the organic particles include particles consisting of polymethyl methacrylate, polyacryl-styrene copolymers, melamine resin, polycarbonate, polystyrene, polyvinyl chloride, benzoguanamine-melamine-formaldehyde condensates, silicone, fluorine resin and polyester resin. Examples of the inorganic particles include particles consisting of silica, alumina, antimony, zirconia and titania.

The content of the particles (particles of micron order) in the resin layer is preferably 5 to 40 parts by mass, more preferably 10 to 25 parts by mass, further preferably 12 to 22 parts by mass, with respect to 100 parts by mass of the resin component.

The average particle size of the particles in the resin layer is preferably 2.0 to 13.0 μm, more preferably 4.0 to 7.0 μm, further preferably 8.0 to 10.0 μm.

The average particle size of the particles can be calculated by the following procedures (1) to (3):
(1) a transmission observation image of the writing sheet is taken under an optical microscope at a magnification of preferably ×500 to ×2000;
(2) arbitrary 10 particles are extracted from the observation image, and the particle size of the individual particles are calculated, wherein the particle size is measured as a distance between arbitrary two straight lines combined so as to attain the largest distance between the two straight lines when the cross section of the particle is sandwiched between the two straight lines parallel to each other; and
(3) the same operation as above is performed as to five observation images taken in different fields of view of the same sample, and a number-average particle size from a total of 50 particles is used as the average particle size of the particles in the resin layer.

It is preferred that the average particle size of the particles should be larger than the film thickness of the resin layer, from the viewpoint of easily adjusting the surface shape of the writing sheet to the range mentioned above. Specifically, [Average particle size of the particles]-[Film thickness of the resin layer] is preferably 2.0 to 7.8 μm, more preferably 4.0 to 7.5 μm, further preferably 5.0 to 7.0 μm.

The resin component of the resin layer preferably contains a cured product of a thermosetting resin composition or an ionizing radiation-curable resin composition and more preferably contains a cured product of an ionizing radiation-curable resin composition, further preferably a cured product of an ultraviolet-curable resin composition, from the viewpoint of improving mechanical strength.

The thermosetting resin composition is a composition containing at least a thermosetting resin and is a resin composition that is cured by heating.

Examples of the thermosetting resin include acrylic resin, urethane resin, phenol resin, urea melamine resin, epoxy resin, unsaturated polyester resin, and silicone resin. The thermosetting resin composition is supplemented with a curing agent, if necessary, in addition to the curable resin.

The ionizing radiation-curable resin composition is a composition containing a compound having an ionizing radiation-curable functional group (hereinafter, also referred to as an "ionizing radiation-curable compound"). Examples of the ionizing radiation-curable functional group include: ethylenic unsaturated bond groups such as (meth)acryloyl group, a vinyl group, and an allyl group; and an epoxy group and an oxetanyl group. The ionizing radiation-curable compound is preferably a compound having an ethylenic unsaturated bond group, more preferably a compound having two or more ethylenic unsaturated bond groups, further preferably a polyfunctional (meth)acrylate compound having two or more ethylenic unsaturated bond groups. Any of monomers and oligomers can be used as the polyfunctional (meth)acrylate compound.

The ionizing radiation means an electromagnetic wave or a charged particle radiation having the quantum of energy capable of polymerizing or cross-linking molecules. Usually, ultraviolet ray (UV) or electron beam (EB) is used. Alternatively, an electromagnetic wave such as X-ray or γ-ray or a charged particle radiation such as α-ray or ion beam may be used.

Among the polyfunctional (meth)acrylate compounds, examples of the difunctional (meth)acrylate monomer include ethylene glycol di(meth)acrylate, bisphenol A tetraethoxy diacrylate, bisphenol A tetrapropoxy diacrylate, and 1,6-hexanediol diacrylate.

Examples of the trifunctional or higher (meth)acrylate monomer include trimethylolpropane tri(meth)acrylate, pentaerythritol tri(meth)acrylate, pentaerythritol tetra(meth)acrylate, dipentaerythritol hexa(meth)acrylate, dipentaerythritol tetra(meth)acrylate, and isocyanuric acid-modified tri (meth)acrylate.

The (meth)acrylate monomer may have a partially modified molecular skeleton. The (meth)acrylate monomer used can be modified with ethylene oxide, propylene oxide, caprolactone, isocyanuric acid, alkyl, cyclic alkyl, an aromatic compound, bisphenol, or the like.

Examples of the polyfunctional (meth)acrylate oligomer include acrylate polymers such as urethane (meth)acrylate, epoxy (meth)acrylate, polyester (meth) acrylate, and polyether (meth)acrylate.

The urethane (meth)acrylate is obtained, for example, through the reaction of a polyhydric alcohol and organic diisocyanate with hydroxy (meth)acrylate.

The epoxy (meth)acrylate is preferably (meth)acrylate obtained by reacting trifunctional or higher aromatic epoxy resin, alicyclic epoxy resin, aliphatic epoxy resin, or the like with (meth)acrylic acid, (meth)acrylate obtained by reacting difunctional or higher aromatic epoxy resin, alicyclic epoxy resin, aliphatic epoxy resin, or the like with polybasic acid and (meth)acrylic acid, or (meth)acrylate obtained by reacting difunctional or higher aromatic epoxy resin, alicyclic epoxy resin, aliphatic epoxy resin, or the like with a phenol and (meth)acrylic acid.

These ionizing radiation-curable compounds can be used alone or in combination of two or more.

When the ionizing radiation-curable compound is an ultraviolet-curable compound, the ionizing radiation-curable composition preferably contains an additive such as a photopolymerization initiator or a photopolymerization accelerator.

The photopolymerization initiator is one or more members selected from the group consisting of acetophenone, benzophenone, α-hydroxyalkylphenone, Michler's ketone, benzoin, benzyl dimethyl ketal, benzoyl benzoate, α-acyloxime ester, thioxanthones, and the like.

The melting point of the photopolymerization initiator is preferably 100° C. or higher. When the melting point of the photopolymerization initiator is 100° C. or higher, a residual photopolymerization initiator is sublimated in the course of production of the writing sheet or in the course of formation of a transparent conductive film of a touch panel. Thus, the contamination of the production apparatus or the transparent conductive film can be prevented.

The photopolymerization accelerator can reduce the inhibition of polymerization by air during curing and accelerate a curing rate. The photopolymerization accelerator is, for example, one or more members selected from the group consisting of p-dimethylaminobenzoic acid isoamyl ester, p-dimethylaminobenzoic acid ethyl ester, and the like.

In the resin layer-forming application liquid, a solvent is usually used for adjusting a viscosity or for allowing each component to be dissolved or dispersed. The surface state of the resin layer after application and drying of the resin layer-forming application liquid differs depending on the type of the solvent. Therefore, it is preferred to select the solvent in consideration of the saturated vapor pressure of the solvent, the permeability of the solvent into a transparent base material, etc. Specifically, examples of the solvent can include ketones (acetone, methyl ethyl ketone, methyl isobutyl ketone, cyclohexanone, etc.), ethers (dioxane, tetrahydrofuran, etc.), aliphatic hydrocarbons (hexane, etc.), alicyclic hydrocarbons (cyclohexane, etc.), aromatic hydrocarbons (toluene, xylene, etc.), halocarbons (dichloromethane, dichloroethane, etc.), esters (methyl acetate, ethyl acetate, butyl acetate, etc.), alcohols (butanol, cyclohexanol, etc.), cellosolves (methylcellosolve, ethylcellosolve, etc.), cellosolve acetates, sulfoxides (dimethyl sulfoxide, etc.), and amides (dimethylformamide, dimethylacetamide, etc.). A mixture thereof may be used.

When the drying of the solvent is slow, the particles easily aggregate inside the resin layer. Therefore, the selection of the solvent is very important for satisfying the conditions (A1) to (A3).

It is preferred that the solvent should be selected according to the average particle size of the particles. For large particles having an average particle size exceeding 10 μm, it is preferred that a solvent having an evaporation rate of 180 or more should be contained at 50% by mass or more, more preferably 60% by mass or more, further preferably 80% by mass or more, in all solvents, from the viewpoint of preventing the aggregation of the particles.

On the other hand, for small particles having an average particle size of 10 μm or smaller, it is preferred that a solvent having an evaporation rate of less than 180 should be contained at 50% by mass or more, more preferably 60% by mass or more, further preferably 70 to 95% by mass, in all solvents, from the viewpoint of allowing the particles to aggregate to some extent.

Examples of the solvent having a relative evaporation rate of 180 or more include toluene (200) and methyl ethyl ketone (370). Examples of the solvent having a relative evaporation rate of less than 180 include methyl isobutyl ketone (160), cyclohexanone (32), isopropyl alcohol (94), and n-butanol (47). The numerical value within the parentheses represents the relative evaporation rate of each solvent.

The aggregation state of the particles can be further controlled by controlling drying conditions (temperature and wind speed of dry air), in addition to the selection of the solvent as mentioned above.

It is preferred that the resin layer-forming application liquid should contain a leveling agent, from the viewpoint of easily adjusting the surface shape of the writing sheet to the range mentioned above. Examples of the leveling agent include fluorine leveling agents, silicone leveling agents, and fluorine-silicone copolymer leveling agents. A silicone leveling agent or a fluorine-silicone copolymer leveling agent is suitable.

The amount of the leveling agent added is preferably 0.01 to 0.5% by weight, more preferably 0.01 to 0.3% by weight, with respect to the total solid content of the resin layer-forming application liquid.

The plastic film can be formed from a resin such as polyester, triacetylcellulose (TAC), cellulose diacetate, cellulose acetate butyrate, polyamide, polyimide, polyethersulfone, polysulfone, polypropylene, polymethylpentene, polyvinyl chloride, polyvinyl acetal, polyether ketone, polymethyl methacrylate, polycarbonate, polyurethane and cyclo-olefin-polymer (COP).

Among these plastic films, polyester (polyethylene terephthalate or polyethylene naphthalate) processed by orienting, particularly, biaxial orienting, is preferred from the viewpoint of mechanical strength and dimensional stability.

The thickness of the plastic film is preferably 5 to 200 μm, more preferably 10 to 150 μm.

[Touch Panel]

The touch panel of embodiment A is a touch panel comprising a sheet on a surface, wherein the writing sheet for a touch panel pen of embodiment A is placed as the sheet such that the side that satisfies the conditions (A1) to (A3) faces the surface of the touch panel.

Examples of the touch panel include resistive touch panels, capacitive touch panels, in-cell touch panels, electromagnetic touch panels, optical touch panels and ultrasonic touch panels. Among them, an electromagnetic touch panel, an optical touch panel or an ultrasonic touch panel which is excellent in optical properties is suitable.

[Display Device]

The display device of embodiment A is a display device comprising a touch panel, wherein the touch panel is the touch panel of embodiment A.

Examples of the display element constituting the display device include liquid-crystal display elements, EL display elements, plasma display elements, electronic paper elements, and in-cell touch panel liquid-crystal display elements. When the display element is a liquid-crystal display element, an EL display element, a plasma display element, or an electronic paper element, the touch panel of embodiment A is placed on this display element.

The display device of embodiment A is capable of offering pencil-like writing feeling without excessively roughening the surface and can therefore suppress drastic impairment of the resolution of the display element. In particular, the display device having an electronic paper element as a display element remarkably exerts the effect described above.

[Method for Selecting Writing Sheet for Touch Panel Pen]

The method for selecting a writing sheet for a touch panel pen according to embodiment A comprises selecting a sheet having a surface whose maximum peak height Rp of a roughness curve and maximum valley depth Rv of the roughness curve defined in JIS B0601: 2001 satisfy the following conditions (A1) and (A2), and whose average wavelength λa calculated according to the following expression (i) from average tilt angle θa and arithmetic average roughness Ra defined in JIS B0601: 2001 satisfies the following condition (A3), as the writing sheet for a touch panel pen (A) given below:

$2.0\ \mu m \leq Rp \leq 8.0\ \mu m$ (A1), $0.8\ \mu m \leq Rv \leq 6.0\ \mu m$ (A2), $45\ \mu m \leq \lambda a \leq 300\ \mu m$ (A3), and $\lambda a = 2\pi \times (Ra/\tan(\theta a))$ (i), <Touch Panel Pen (A)> the touch panel pen having an angled part in at least a portion of a tip region, wherein a volumetric change of the tip region upon application of a vertical load of 100 gf is 1.0% or less.

The method for selecting a writing sheet for a touch panel pen according to embodiment A can select a writing sheet that offers pencil-like writing feeling even without a writing test using the touch panel pen (A). Thus, efficient product design and quality control of writing sheets can be achieved.

Essential criteria for selecting the writing sheet for a touch panel pen are the conditions (A1) to (A3). The criteria of the conditions (A1) to (A3) are preferably the aforementioned suitable numerical ranges of the writing sheet of embodiment A. For example, for the criterion of the condition (A1), it is preferred to satisfy $2.5\ \mu m \leq Rp \leq 7.0\ \mu m$, more preferably $4.0\ \mu m \leq Rp \leq 6.0\ \mu m$.

For the method for selecting a writing sheet for a touch panel pen according to embodiment A, it is more preferred to use one or more of the following conditions (A4) to (A6) as a criterion, further preferably all the conditions (A4) to (A6) as criteria, from the viewpoint of more favorable writing feeling, etc.:

$0.3\ \mu m \leq Ra \leq 2.5\ \mu m$ (A4), $4.0\ \mu m \leq W_{EM} \leq 15.0\ \mu m$ (A5), and a haze of 15 to 75% (A6).

The criteria of the conditions (A4) to (A6) are preferably the aforementioned suitable numerical ranges of the writing sheet of embodiment A.

Embodiment B

[Method for Selecting Writing Sheet for Touch Panel Pen]

The method for selecting a writing sheet for a touch panel pen according to embodiment B comprises selecting a sheet that satisfies the following conditions (B1) and (B2), as the writing sheet for a touch panel pen:

<Condition (B1)> the touch panel pen is fixed in contact at an angle of 60 degrees with the surface of the writing sheet for a touch panel pen; while a vertical load of 100 gf is applied to the touch panel pen, the writing sheet for a touch panel pen is moved 40 mm in one-way length at a rate of 14 mm/sec; friction force on the touch panel pen in the direction of the movement is measured at 0.001-second intervals to calculate kinetic friction force $F_k$; and when a standard deviation of the $F_k$ is calculated, the standard deviation is 3.0 gf or more and 11.0 gf or less; and <Condition (B2)> after the completion of the movement of 40 mm in one-way length of the writing sheet for a touch panel pen under the condition (B1), the vertical load of 100 gf applied to the touch panel pen is maintained, and the touch panel pen is kept in contact at an angle of 60 degrees with the surface of the writing sheet for a touch panel pen; in this state, friction force on the touch panel pen in the direction of the movement is regarded as residual friction force $F_{re}$; and when the $F_{re}$ is measured at 0.001 second-intervals, the $F_{re}$ is 4.5 gf or more and 15.0 gf or less on average.

The 60 degrees mean that the touch panel pen is inclined 60 degrees with respect to the sheet surface when the direction parallel to the surface of the writing sheet for a touch panel pen is defined as 0 degrees.

Figure 8:
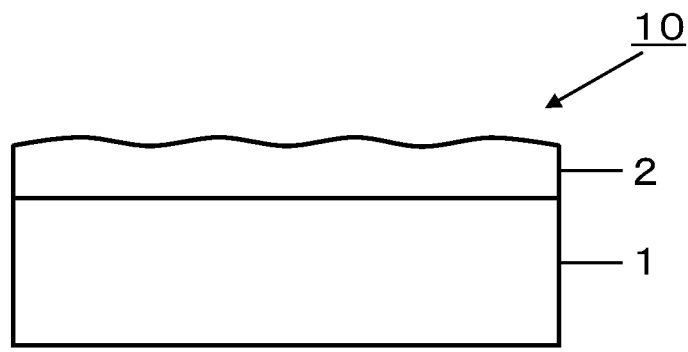
FIG. 8 is a cross-sectional view showing one embodiment of the writing sheet for a touch panel pen of the present invention.
Figure 9:
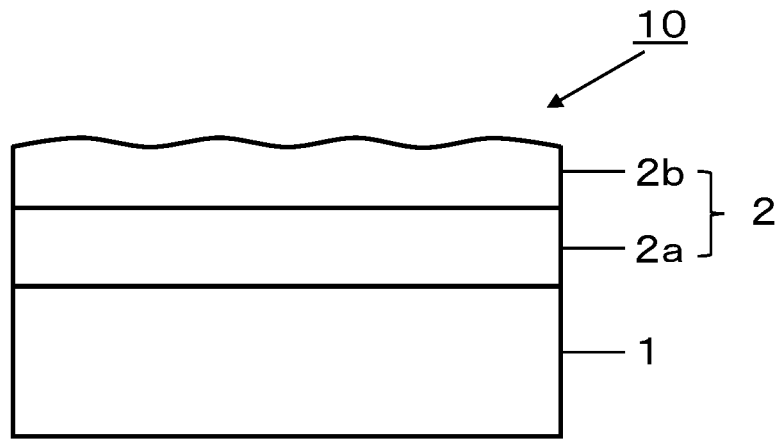
FIG. 9 is a cross-sectional view showing another embodiment of the writing sheet for a touch panel pen of the present invention.

Each of FIGS. 8 and 9 is a cross-sectional view showing one embodiment of writing sheet 10 for a touch panel pen of embodiment B. The writing sheet 10 for a touch panel pen shown in FIGS. 8 and 9 has resin layer 2 on one side of base material 1.

In the writing sheet for a touch panel pen of embodiment B, one of the surfaces may satisfy the conditions (B1) and (B2), or both the surfaces may satisfy the conditions (B1) and (B2).

The writing sheet for a touch panel pen of embodiment A may be in a sheet-like form or may be a long sheet coiled in a roll form.

Hereinafter, the writing sheet for a touch panel pen is also referred to as a "writing sheet", and the surface that satisfies the conditions (B1) and (B2) is also referred to as a "writing surface".

<Writing Surface>

The method for selecting a writing sheet for a touch panel pen according to embodiment B comprises selecting a sheet having a surface that satisfies the conditions (B1) and (B2), as the writing sheet for a touch panel pen. Hereinafter, the technical idea of the design of the conditions (B1) and (B2) will be described.

First, the technical idea of the design of the condition (B1) will be described.

The condition (B1) is a parameter as to kinetic friction force. Small kinetic friction force makes a writing feel slippery and cannot produce a high level of writing feeling. In other words, a predetermined level of kinetic friction force is probably important for obtaining a high level of writing feeling.

The present inventors have further conducted studies on the relationship between writing feeling and kinetic friction force and consequently found that even if the predetermined level of kinetic friction force is present, persons perceive a slippery feel in the absence of time-dependent change in kinetic friction force. The present inventors have further conducted studies and consequently found that persons perceive change in friction at surprisingly short intervals.

Figure 10:
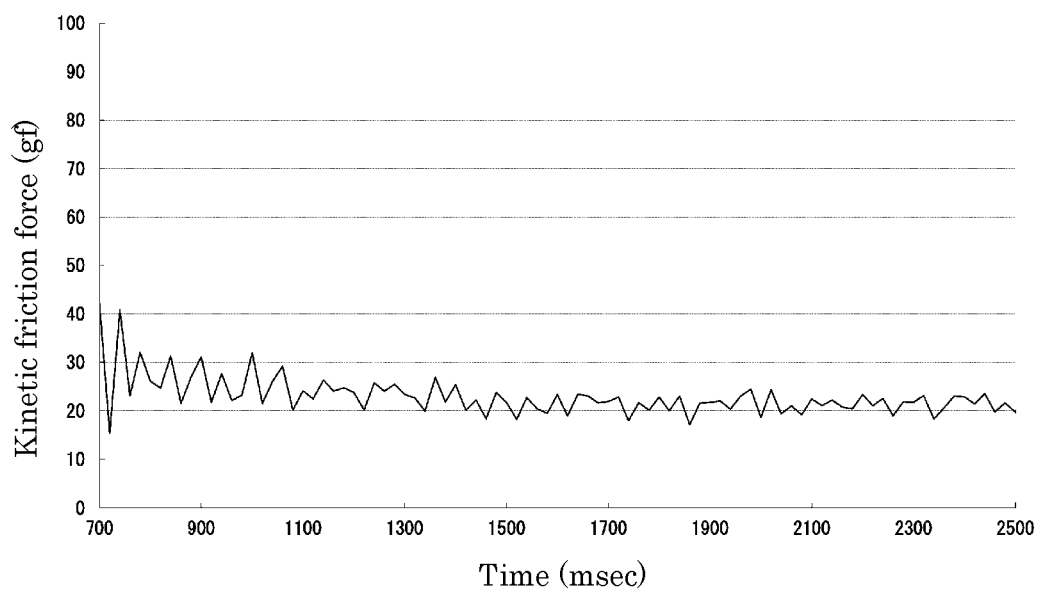
FIG. 10 is a diagram showing one example of change in friction force every 20 ms upon pencil writing on paper.
Figure 11:
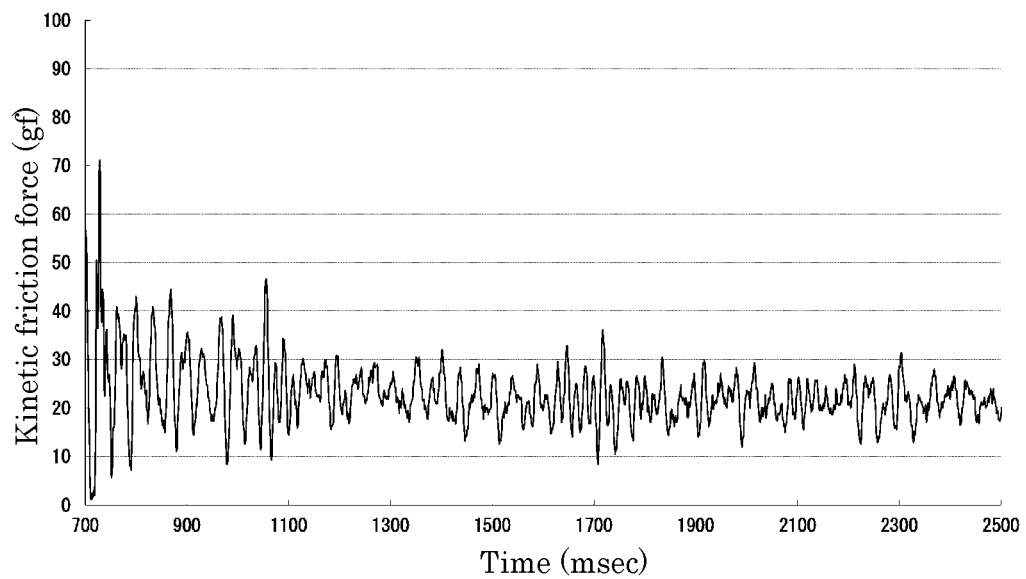
FIG. 11 is a diagram showing one example of change in friction force every 1 ms upon pencil writing on paper.

Each of FIGS. 10 and 11 shows one example of kinetic friction force at each point in time upon pencil writing on paper. In FIG. 10, the kinetic friction force is measured every 20 ms. In FIG. 11, the kinetic friction force is measured every 1 ms. The ordinates of FIGS. 10 and 11 depict the kinetic friction force, and the abscissas thereof depict the time (ms). The measurement conditions for the kinetic friction force shown in FIGS. 10 and 11 involve a load of 100 gf and a writing rate of 14 mm/s.

From the comparison between FIGS. 10 and 11, it can be confirmed that the amplitude of the kinetic friction force differs largely depending on difference in measurement intervals. This is probably because of the influence of fiber pitch of the paper surface. Specifically, this is probably because the number of climbs of a pencil over the paper fibers varies largely among the runs of the measurement at 1-ms (0.001-second) intervals, whereas the number of climbs of the pencil over the paper fibers less varies among the runs of the measurement at 20-ms (0.02-second) intervals. In other words, it is considered that the measurement at 1-ms intervals exhibits large variations due to non-averaged values, whereas the measurement at 20-ms intervals exhibit small variations due to averaged values.

As a result of preparing various writing sheets, conducting the same measurement as above, and comparing the results with sensory evaluation (writing feeling perceived by persons), the present inventors have found that, surprisingly, persons can recognize variations in friction force at intervals as very short as 1-ms intervals, as writing feeling.

The condition (B1) requires that a standard deviation of kinetic friction force $F_k$ calculated from results of measuring friction force at 0.001-second intervals under the predetermined conditions is 3.0 gf or more and 11.0 gf or less.

If the standard deviation is less than 3.0 gf, persons perceive a slippery writing feel because the time-dependent change in kinetic friction force is small. Thus, a high level of writing feeling cannot be obtained.

If the standard deviation exceeds 11.0 gf, persons perceive heavy feeling in the movement of a touch panel pen or feel the nib caught on. Thus, a high level of writing feeling cannot be obtained. Furthermore, if the standard deviation exceeds 11.0 gf, the nib of a touch panel pen tends to be heavily worn.

The standard deviation is preferably 4.5 gf or more and 9.0 gf or less, more preferably 4.8 gf or more and 7.0 gf or less.

The standard deviation of the kinetic friction force $F_k$, and $F_{re}$ on average and $F_k$ on average mentioned later are set to average values from 20 samples each measured once.

Next, the technical idea of the design of the condition (B2) will be described.

When characters or graphics are drawn, writing is often restarted after being halted for a moment. For example, in order to change the direction of writing, the writing is usually halted for a moment, and then, the direction of writing is changed. It is conceivable that static friction force is largely related to writing feeling upon restart after halt. Nonetheless, according to the studies of the present inventors, sufficient correlation between them has not been found in some cases.

The condition (B2) requires that: after the completion of the movement of the writing sheet under the condition (B1), the load condition of the touch panel pen and the contact condition of the touch panel pen with the writing sheet are maintained; and in this state, when friction force (residual friction force $F_{re}$) on the touch panel pen in the direction of the movement is measured at 0.001 second-intervals, the $F_{re}$ is 4.5 gf or more and 15.0 gf or less on average.

The residual friction force $F_{re}$ under the condition (B2) probably indicates ease of stopping for the nib in halting writing for a moment, and critical force required for restarting the touch panel pen.

If $F_{re}$ is less than 4.5 gf on average, the nib is difficult to stop when writing is halted for a moment. Thus, favorable writing feeling cannot be achieved. Furthermore, if $F_{re}$ is less than 4.5 gf on average, the nib slips when writing is halted for a moment and then restarted. This makes it difficult to change the direction of writing as desired. Thus, favorable writing feeling cannot be achieved.

If $F_{re}$ exceeds 15.0 gf on average, persons easily get tired by long-time writing due to a large load when writing is halted for a moment and then restarted. In addition, it is difficult to change the direction of writing as desired. Thus, favorable writing feeling cannot be achieved.

$F_{re}$ is preferably 6.5 gf or more and 10.7 gf or less, more preferably 7.5 gf or more and 10.5 gf or less.

In embodiment B, the parameters of the standard deviation of $F_k$, $F_{re}$ on average and other frictions are set to average values from 10 measurements.

FIG. 7 is a diagrammatic view illustrating a method for measuring $F_k$ and $F_{re}$.

In FIG. 7, touch panel pen 81 is fixed in contact with writing sheet 10 by holding fixture 84. Base 85 for the placement of weight 83 thereon is attached to an upper part of the holding fixture 84. The weight 83 is placed on the base 85 and thereby applies a vertical load to the touch panel pen. The writing sheet 10 is fixed onto movable mount 82.

For the friction force measurement, the movable mount 82 with the writing sheet 10 fixed thereon is moved at the predetermined rate to the obtuse direction side (left side of FIG. 7) of an angle formed by the writing sheet and the touch panel pen, with the touch panel pen fixed as described above. In this respect, friction force is generated on the touch panel pen 81 in the direction of the movement of the writing sheet 10. $F_k$ can be calculated from the friction force at each point in time. Also, the residual friction force $F_{re}$ which is friction force after the completion of the movement of the writing sheet 10 can be measured.

Examples of the apparatus capable of the measurement shown in FIG. 7 include HEIDON-14DR (trade name) manufactured by Shinto Scientific Co., Ltd.

In embodiment B, it is preferred to measure the parameter as to the friction force such as $F_k$ or $F_{re}$ as described below in (A) to (E).

(A) Zero-Point Correction

The touch panel pen is fixed in contact at an angle of 60 degrees with the surface of the writing sheet for a touch panel pen, and a vertical load of 100 gf is applied to the touch panel pen. In this state (the writing sheet is not moved), the writing sheet is left standing for 100 ms. Friction force generated on the touch panel pen in the obtuse direction is measured at 0.001-second intervals. The largest value of the friction force for the measurement time from 1 ms to 100 ms is subtracted from all measurement values of the friction force (all measured friction force values from the friction force at 1 ms to the friction force at the completion of the measurement of the residual friction force), and the obtained value is used as the friction force at each point in time for zero-point correction. Calculation in (C) to (E) mentioned later is performed on the basis of the friction force after the zero-point correction.

(B) Actual Measurement Time

Triple the standard deviation of the friction force for the measurement time from 1 ms to 100 ms before the zero-point correction is used as a "threshold". The writing sheet further left standing for 500 ms after being left standing for 100 ms as described above in (A) is moved at a rate of 14 mm/sec to the obtuse direction side of an angle formed by the writing sheet and the touch panel pen. Friction force on the touch panel pen in the obtuse direction is measured at 0.001-second intervals. The time to first excess the threshold after the start of the movement of the writing sheet is defined as the time of "onset of actual measurement".

(C) Maximum Friction Force $F_{Max}$

Maximum friction force $F_{max}$ is calculated from the largest friction force within 1500 ms from the onset of actual measurement.

(D) Kinetic Friction Force $F_k$

The time to generate the maximum friction force $F_{max}$ is used as a first peak time.

Average friction force from the time of onset of actual measurement to the time of completion of the movement of 40 mm in length of the writing sheet is used as provisional average friction force. The time to first generate friction force that exceeds [Provisional average friction force+(Maximum friction force×0.1)] after a lapse of 30 ms from the first peak time is used as a second peak time.

The time after a lapse of 500 ms from the second peak time is used as the starting time of kinetic friction force measurement. The time to complete the movement of 40 mm in length of the writing sheet is used as the ending time of the kinetic friction force measurement. The kinetic friction force is measured during the starting time and the ending time, and the standard deviation of the kinetic friction force $F_k$ and the kinetic friction force $F_k$ on average can be calculated.

(E) Residual Friction Force $F_{re}$

After the completion of the movement of 40 mm in one-way length of the writing sheet, the vertical load of 100 gf applied to the touch panel pen is maintained, and the touch panel pen is kept in contact at an angle of 60 degrees with the surface of the writing sheet for a touch panel pen. In this state, friction force (residual friction force $F_{re}$) on the touch panel pen in the obtuse direction is measured. As for the measurement time of the residual friction force $F_{re}$, the time after a lapse of 500 ms from the completion of the movement of 40 mm in one-way length of the writing sheet is used as the starting time of measurement. The time after a lapse of 400 ms therefrom is used as the ending time of the measurement. The residual friction force $F_{re}$ on average is calculated from the residual friction force $F_{re}$ at each point in time.

For the method for selecting a writing sheet according to embodiment B, it is preferred to select a sheet that satisfies the following condition (B3), from the viewpoint of obtaining a higher level of writing feeling and from the viewpoint of suppressing nib wear:

<Condition (B3)> the $F_k$ is 7.0 gf or more and 25.0 gf or less on average.

The $F_k$ is more preferably 8.0 gf or more and 20.0 gf or less, further preferably 10.0 gf or more and 17.0 gf or less, on average.

The touch panel pen for use in the determination of the conditions (B1) to (B3) is not particularly limited and can be appropriately selected from among commercially available touch panel pens.

If a material of the nib of the touch panel pen does not get stuck in the surface asperities of the writing sheet, it is difficult to design the writing sheet that satisfies the conditions (B1) to (B3). Therefore, for the touch panel pen for use in the determination of the conditions (B1) to (B3), it is preferred that the nib should have given flexibility. However, a nib formed only from a material having flexibility may be worn at encroaching parts of convex parts of a film, leading to shorter of life, or may be difficult to move away from the surface asperities of the writing sheet. Thus, for the touch panel pen for use in the determination of the conditions (B1) to (B3), it is preferred that the tip region of the pen should have at least two regions. Specifically, it is preferred that the tip region of the pen should have at least (i) a region promoting deformation and (ii) a region providing hardness. It is also preferred that regions (i) promoting deformation and regions (ii) providing hardness should coexist on a regular basis or at random. Examples of the configuration in which the regions (i) and the regions (ii) coexist include a porous configuration (air holes serve as the regions (i) promoting deformation), and a configuration in which soft raw materials are mixed into hard raw materials.

Examples of the region (i) promoting deformation include air holes. Examples of the region (ii) providing hardness include raw materials having a Young's modulus of 1.2 GPa or more. The Young's modulus of the raw material of the region (ii) providing hardness is preferably 2.0 GPa or more, more preferably 2.5 GPa or more. The Young's modulus of the raw material of the region (ii) providing hardness is preferably 5.0 GPa or less, more preferably 4.0 GPa or less, further preferably 3.5 GPa or less, from the viewpoint of suppressing the wear of the writing sheet.

The volume ratio between the region (i) and the region (ii) is preferably 98:2 to 70:30, more preferably 95:5 to 75:25, further preferably 90:10 to 80:20.

The atmosphere for the measurement of the Young's modulus E involves a temperature of 23° C.±5° C. and a humidity of 50%±10%. Before the start of measurement of the Young's modulus E, a measurement sample is left in an atmosphere involving 23° C.±5° C. and a humidity of 50%±10% for 10 minutes or longer.

The tip region refers to a region within 1.5 mm from the nib of the touch panel pen.

For the touch panel pen for use in the determination of the conditions (B1) to (B3), the diameter of the nib is preferably 0.3 to 2.5 mm, more preferably 0.5 to 2.0 mm, further preferably 0.7 to 1.7 mm.

The diameter D of the nib is calculated with reference to a photograph of the touch panel pen taken from the vertical direction side with respect to the pen holder. In FIG. 6, the outside shape of the touch panel pen photographed from the vertical direction side with respect to the pen holder is indicated by a dotted line. As shown in FIG. 6(*a*), a circle is superimposed on the outside shape in the photograph such that the circle passes through the top of the outside shape and does not exceed the outside shape. In this respect, the diameter of the largest circle is defined as the diameter D of the nib. As shown in FIG. 6(*b*), however, if the outside shape in the photograph has an incline with an angle of 40 to 90 degrees with respect to the pen holder, the circle may be superimposed on the outside shape so as to exceed the incline.

For the method for selecting a writing sheet according to embodiment B, it is preferred to select a writing sheet whose haze defined in JIS K7136: 2000 satisfies the following condition (B4):

<Condition (B4)> the haze is 25.0% or more.

When the haze is 25.0% or more, scintillation (phenomenon in which fine variations in luminance are seen in screen image light) can be easily suppressed.

The haze is more preferably 35.0% or more, further preferably 45.0% or more, from the viewpoint of the suppression of scintillation. The haze is preferably 90.0% or less, more preferably 70.0% or less, further preferably 67.0% or less, still further preferably 60.0% or less, from the viewpoint of the suppression of decrease in the resolution of a display element.

For the measurement of the haze and a total light transmittance mentioned later, light is incident on a surface opposite to the writing surface (surface that satisfies the conditions (B1) and (B2)) of the writing sheet. When both the surfaces of the writing sheet are writing surfaces, the surface of light incidence may be either of the surfaces. The haze and the total light transmittance are set to average values from 20 samples each measured once.

For the method for selecting a writing sheet according to embodiment B, it is preferred to select a writing sheet whose total light transmittance defined in JIS K7361-1: 1997 satisfies the following condition (B5):

<Condition (B5)> the total light transmittance is 87.0% or more.

When the total light transmittance is 87.0% or more, decrease in the luminance of a display element can be suppressed.

The total light transmittance is more preferably 88.0% or more, further preferably 89.0% or more. Too high a total light transmittance tends to hinder the writing sheet from satisfying the conditions (B1) and (B2). Therefore, the total light transmittance is preferably 92.0% or less, more preferably 91.5% or less, further preferably 91.0% or less.

[Writing Sheet for Touch Panel Pen]

The writing sheet for a touch panel of embodiment B has a surface that satisfies the following conditions (B1) and (B2):

<Condition (B1)> the touch panel pen is fixed in contact at an angle of 60 degrees with the surface of the writing sheet for a touch panel pen; while a vertical load of 100 gf is applied to the touch panel pen, the writing sheet for a touch panel pen is moved 40 mm in one-way length at a rate of 14 mm/sec; friction force on the touch panel pen in the direction of the movement is measured at 0.001-second intervals to calculate kinetic friction force $F_k$; and when a standard deviation of the $F_k$ is calculated, the standard deviation is 3.0 gf or more and 11.0 gf or less; and <Condition (B2)> after the completion of the movement of 40 mm in one-way length of the writing sheet for a touch panel pen under the condition (B1), the vertical load of 100 gf applied to the touch panel pen is maintained, and the touch panel pen is kept in contact at an angle of 60 degrees with the surface of the writing sheet for a touch panel pen; in this state, friction force on the touch panel pen in the direction of the movement is regarded as residual friction force $F_{re}$; and when the $F_{re}$ is measured at 0.001 second-intervals, the $F_{re}$ is 4.5 gf or more and 15.0 gf or less on average.

It is preferred that the writing sheet of embodiment B should satisfy the conditions (B1) and (B2) even when the touch panel pen is fixed in contact at an angle other than 60 degrees (e.g., any angle in the range of 30 to 75 degrees) with the writing surface. It is also preferred that the conditions (B1) and (B2) should fall within the ranges described above even when the moving rate is set to a rate other than 14 mm/sec (e.g., any rate in the range of 0.1 to 100 mm/sec).

For the writing sheet of embodiment B, it is preferred that $F_k$ of the writing surface should satisfy the following condition (B3), from the viewpoint of obtaining a higher level of writing feeling and from the viewpoint of suppressing nib wear:

<Condition (B3)> the $F_k$ is 7.0 gf or more and 25.0 gf or less on average.

The suitable ranges of the conditions (B1) to (B3) for the writing sheet of embodiment B are the same as those of the conditions (B1) to (B3) for the aforementioned method for selecting a writing sheet for a touch panel pen.

For easily satisfying the conditions (B1) to (B3), it is preferred to use the writing sheet of embodiment B as a writing sheet for a touch panel pen whose tip region has at least (i) a region promoting deformation and (ii) a region providing hardness. Specific embodiments of the region (i) promoting deformation and the region (ii) providing hardness are as mentioned above.

It is also preferred to use the writing sheet of embodiment B as a writing sheet for a touch panel pen having a nib diameter in the range mentioned above.

For the writing sheet of embodiment B, it is preferred that the haze defined in JIS K7136: 2000 should satisfy the following condition (B4):

<Condition (B4)> the haze is 25.0% or more.

For the writing sheet of embodiment B, it is preferred to select a writing sheet whose total light transmittance defined in JIS K7361-1: 1997 satisfies the following condition (B5):

<Condition (B5)> the total light transmittance is 87.0% or more.

The suitable ranges of the conditions (B4) and (B5) for the writing sheet of embodiment B are the same as those of the conditions (B4) and (B5) for the aforementioned method for selecting a writing sheet for a touch panel pen.

<Overall Configuration of Writing Sheet>

The writing sheet for a touch panel pen of embodiment B is not particularly limited by its configuration as long as at least one of the surfaces satisfies the conditions (B1) and (B2).

Examples of the configuration of the writing sheet 10 for a touch panel pen of embodiment B include, as shown in FIGS. 8 and 9, a configuration having resin layer 2 on base material 1, wherein one of the surfaces of the resin layer 2 satisfies the conditions (B1) and (B2). The resin layer 2 may have a multilayer structure of first resin layer 2*a* and second resin layer 2*b*, as shown in FIG. 9.

Although not shown, the writing sheet 10 for a touch panel pen of embodiment B may be configured to have a single resin layer without the base material or to have an additional layer other than the base material and the resin layer, and a surface of the additional layer may satisfy the conditions (B1) and (B2). Examples of the additional layer include antistatic layers and antifouling layers.

The writing surface can be formed by "physical or chemical treatment such as embossing, sandblasting, or etching", "molding using a mold", "coating", etc. Among these methods, "molding using a mold" is suitable from the viewpoint of the reproducibility of the surface shape, and "coating" is suitable from the viewpoint of productivity and response to multi-itemed production.

For satisfying the conditions (B1) and (B2) by the writing sheet, it is preferred that the writing surface of the writing sheet should satisfy physical properties (a) to (f) given below. The physical properties (a) to (f) are set to average values from 20 samples each measured once.

Cutoff value for calculating Rt, θa, and λa mentioned later is 0.8 mm. Considering that the diameter of the expected nib is preferably 0.3 to 2.5 mm, more preferably 0.5 to 2.0 mm, further preferably 0.7 to 1.7 mm, the cutoff value is selected as cutoff value which is contained within stated every size of the diameter, from among cutoff values defined by JIS.

(a) Maximum profile height Rt of a roughness curve of the writing surface defined in JIS B0601: 2001 is 2.5 μm or more and 8.0 μm or less.
(b) Average tilt angle θa of the writing surface is 2.0 degrees or more and 7.5 degrees or less.
(c) Average wavelength λa calculated according to the expression [λa=2π×(Ra/tan(θa))] from the average tilt angle θa and arithmetic average roughness Ra defined in JIS B0601: 2001 is 40 μm or more and 150 μm or less.
(d) The area ratio of particles of the writing surface is 18.0% or more and 35.0% or less.
(e) The quotient of the λa (μm) and the particle density of the writing surface of 100 μm square (the number of particles/100 μm square) [λa (μm)/Particle density (the number of particles/100 μm square)] is 40 or more and 110 or less.
(f) the Martens' hardness of the writing sheet at an indentation depth of 3 μm is 100 N/mm$^2$ or more and 350 N/mm$^2$ or less.

The physical properties (a) to (e) mean that: the asperities of the writing surface include asperities having a moderate size without having a large number of exceedingly high peaks and exceedingly low valleys; and the convex parts of the writing surface are moderately densely packed. The writing surface can satisfy the physical properties (a) to (e) and thereby easily satisfy the conditions (B1) and (B2).

The satisfied physical properties (a) to (e) also lead to the suppression of scintillation and the suppression of the nib wear of a touch panel pen.

The physical property (f) indicates ease of deformation of the writing sheet. When the movement of a touch panel pen is stopped for a moment, a region where the nib of the touch panel pen is present on the writing surface is moderately subducted as compared with its neighboring regions, provided that the physical property (f) is satisfied. Therefore, the residual friction force $F_{re}$ is easily generated so that the condition (B2) is easily satisfied. The excessive roughening of the writing surface also easily generates the residual friction force $F_{re}$. In this case, however, it is difficult to satisfy the condition (B1) due to the increased amplitude of the kinetic friction force $F_k$.

For satisfying the physical property (f), the Martens' hardness of the base material alone at an indentation depth of 3 μm is preferably 125 N/mm$^2$ or more and 175 N/mm$^2$ or less, more preferably 140 N/mm$^2$ or more and 170 N/mm$^2$ or less.

Rt as the physical property (a) is more preferably 2.8 μm or more and 6.0 μm or less, further preferably 3.0 μm or more and 4.5 μm or less.

θa as the physical property (b) is more preferably 2.1 degrees or more and 5.0 degrees or less, more preferably 2.2 degrees or more and 4.5 degrees or less.

λa as the physical property (c) is more preferably 50 μm or more and 100 μm or less, further preferably 55 μm or more and 85 μm or less.

The area ratio as the physical property (d) is more preferably 19.0% or more and 32.0% or less, further preferably 20.0% or more and 30.0% or less.

The quotient as the physical property is more preferably 50 or more and 100 or less, further preferably 55 or more and 80 or less.

The Martens' hardness as the physical property (f) is more preferably 120 N/mm$^2$ or more and 300 N/mm$^2$ or less, further preferably 140 N/mm$^2$ or more and 250 N/mm$^2$ or less.

The "average tilt angle θa" from which λa as the physical property (c) is calculated is a value defined in the manual (revised on 1995.07.20) of a surface roughness tester (trade name: SE-3400) manufactured by Kosaka Laboratory Ltd. and can be determined according to an arc tangent of the sum of projection heights $(h_1+h_2+h_3+ \ldots +h_n)$ present at reference length L, i.e., $\theta a = \tan^{-1}\{(h_1+h_2+h_3+ \ldots +h_n)/L\}$, as shown in FIG. 4.

θa can be calculated according to the expression (A) shown in embodiment A.

The area ratio of particles as the physical property (d) can be calculated by binarizing an image using image analysis software from a planar photograph of the writing surface taken under a scanning electron microscope (SEM), and selecting particle parts. The particle density of the writing surface of 100 μm square (the number of particles/100 μm square) from which the physical property (e) is calculated can be calculated by counting the number of regions with independent particle parts in the image binarized as mentioned above. Examples of the image analysis software include WinRoof (trade name) manufactured by Mitani Corp.

The Martens' hardness of the writing sheet at an indentation depth of 3 μm as the physical property (f) is a value measured by preparing a sample having a pressure-sensitive adhesive layer (pressure-sensitive adhesive layer formed with a pressure-sensitive adhesive having a storage elastic modulus of 1.0×10$^5$ Pa or more, preferably 2.5×10$^5$ Pa, at 23° C.) with a thickness of 25 μm formed on a surface on the base material side of the writing sheet, followed by measurement from a surface opposite to the pressure-sensitive adhesive layer of the sample.

The Martens' hardness is a value measured using an ultra-microhardness tester and can be calculated by pressing a pyramid-shaped diamond indenter against a sample while continuously increasing a load, calculating surface area A (mm$^2$) of a pyramid-shaped depression formed on the surface from the length of its diagonal line, and dividing test load F (N) by the surface area A. In other words, the Martens' hardness of the base material at an indentation depth of 3 μm can be calculated by dividing the test load F (N) at the indentation depth that has reached 3 μm by the surface area of the indenter at the indentation depth of 3 μm.

The measurement is preferably performed in an environment of 23° C. It is also desirable to keep, for 10 seconds, the indentation depth that has reached 3 μm, and then draw up the indenter at a given displacement rate.

Examples of the ultra-microhardness tester include HM500 (trade name) manufactured by Helmut Fischer GmbH.

Likewise, the Martens' hardness of the base material can also be measured according to the same approach as above, by preparing a sample having a pressure-sensitive adhesive layer with a thickness of 25 μm formed on one side of the base material, followed by measurement from a surface opposite to the pressure-sensitive adhesive layer of the sample.

For the writing sheet of embodiment B, the pencil hardness of the writing surface defined in JIS K5600-5-4: 1999 is preferably 2H or more and 9H or less, more preferably 5H or more and 7H or less, further preferably 5H or more and 6H or less, from the viewpoint of suppressing the wear of a touch panel pen while improving the scratch resistance of the writing surface.

The formation of the resin layer by the coating can be performed by applying a resin layer-forming application liquid containing a resin component, particles and a solvent onto the base material by an application method known in the art such as gravure coating or bar coating, followed by drying and curing. For easily satisfying the conditions (B1) and (B2) by the resin layer formed by the coating, it is preferred to set the average particle size of the particles, the content of the particles, and the thickness of the resin layer, etc. to ranges mentioned later.

When the resin layer is constituted by two or more layers as shown in FIG. 9, at least any of the resin layers may contain the particles. It is preferred that an uppermost-surface resin layer should contain the particles, from the viewpoint of easily satisfying the conditions (B1) and (B2). Alternatively, the uppermost-surface resin layer may contain the particles while lower resin layer(s) may contain no particles. This configuration can easily improve the pencil hardness of the writing surface.

Any of organic particles and inorganic particles can be used as the particles of the resin layer. Examples of the organic particles include particles consisting of polymethyl methacrylate, polyacryl-styrene copolymers, melamine resin, polycarbonate, polystyrene, polyvinyl chloride, benzoguanamine-melamine-formaldehyde condensates, silicone, fluorine resin and polyester resin. Examples of the inorganic particles include particles consisting of silica, alumina, antimony, zirconia and titania. Among these particles, organic particles are suitable from the viewpoint of easily suppressing the aggregation of the particles and easily satisfying the conditions (B1) and (B2).

The particles are preferably spherical particles from the viewpoint of the suppression of nib wear of a touch panel pen.

The average particle size of the particles in the resin layer differs depending on the thickness of the resin layer and therefore, cannot be generalized. The average particle size of the particles is preferably 1.0 to 10.0 μm, more preferably 2.0 to 5.0 μm, further preferably 2.5 to 3.5 μm, from the viewpoint of easily satisfying the conditions (B1) and (B2). For aggregated particles, it is preferred that the average particle size of the aggregated particles should satisfy the range described above. The average particle size of the particles can be calculated by the same approach as in embodiment A.

The particles may have a wide particle size distribution (a wide particle size distribution of single particles or a wide particle size distribution of mixed particles from two or more types of particles differing in particle size distribution). A narrower particle size distribution is more preferred from the viewpoint of suppressing scintillation. Specifically, the coefficient of variation of the particle size distribution of the particles is preferably 25% or less, more preferably 20% or less, further preferably 15% or less.

The content of the particles in the resin layer is preferably 15 to 20 parts by mass, more preferably 18 to 23 parts by mass, further preferably 20 to 25 parts by mass, with respect to 100 parts by mass of the resin component from the viewpoint of easily satisfying the conditions (B1) and (B2).

The suitable range of the film thickness of the resin layer differs slightly depending on an embodiment of the resin layer. For example, the thickness of the resin layer containing the particles is preferably 2.0 to 8.0 μm, more preferably 2.2 to 6.0 μm, further preferably 2.7 to 4.0 μm, from the viewpoint of easily satisfying the conditions (B1) and (B2), from the viewpoint of improving the pencil hardness of the writing surface, and from the viewpoint of suppressing curl.

The ratio of [the average particle size of the particles]/[the film thickness of the resin layer containing the particles] is preferably 0.7 to 1.3, more preferably 0.8 to 1.2, further preferably 0.9 to 1.1, from the viewpoint of easily satisfying the conditions (B1) and (B2).

It is preferred that a resin layer containing no particles should be positioned nearer the base material than the resin layer containing the particles. Its thickness is preferably 3.0 to 15.0 μm, more preferably 6.0 to 10.0 μm, from the viewpoint of improving the pencil hardness of the writing surface and from the viewpoint of suppressing curl.

The film thickness of the resin layer can be calculated, for example, from an average value of thicknesses at 20 locations measured from a cross-sectional image taken using a scanning transmission electron microscope (STEM). The accelerating voltage of STEM is preferably 10 kV to 30 kV, and the magnification of STEM is preferably ×1000 to ×7000.

The resin component of the resin layer preferably contains a cured product of a thermosetting resin composition or an ionizing radiation-curable resin composition and more preferably contains a cured product of an ionizing radiation-curable resin composition, further preferably a cured product of an ultraviolet-curable resin composition, from the viewpoint of improving the pencil hardness of the writing surface.

The thermosetting resin composition is a composition containing at least a thermosetting resin and is a resin composition that is cured by heating.

Examples of the thermosetting resin include acrylic resin, urethane resin, phenol resin, urea melamine resin, epoxy resin, unsaturated polyester resin, and silicone resin. The thermosetting resin composition is supplemented with a curing agent, if necessary, in addition to the curable resin.

The ionizing radiation-curable resin composition is a composition containing a compound having an ionizing radiation-curable functional group (hereinafter, also referred to as an "ionizing radiation-curable compound"). Examples of the ionizing radiation-curable functional group include: ethylenic unsaturated bond groups such as (meth)acryloyl group, a vinyl group, and an allyl group; and an epoxy group and an oxetanyl group. The ionizing radiation-curable compound is preferably a compound having an ethylenic unsaturated bond group, more preferably a compound having two or more ethylenic unsaturated bond groups, further preferably a polyfunctional (meth)acrylate compound having two or more ethylenic unsaturated bond groups. Any of monomers and oligomers can be used as the polyfunctional (meth)acrylate compound.

The ionizing radiation means an electromagnetic wave or a charged particle radiation having the quantum of energy capable of polymerizing or cross-linking molecules. Usually, ultraviolet ray (UV) or electron beam (EB) is used. Alternatively, an electromagnetic wave such as X-ray or γ-ray or a charged particle radiation such as α-ray or ion beam may be used.

Among the polyfunctional (meth)acrylate compounds, examples of the difunctional (meth)acrylate monomer include ethylene glycol di(meth)acrylate, bisphenol A tetraethoxy diacrylate, bisphenol A tetrapropoxy diacrylate, and 1,6-hexanediol diacrylate.

Examples of the trifunctional or higher (meth)acrylate monomer include trimethylolpropane tri(meth)acrylate, pentaerythritol tri(meth)acrylate, pentaerythritol tetra(meth)acrylate, dipentaerythritol hexa(meth)acrylate, dipentaerythritol tetra(meth)acrylate, and isocyanuric acid-modified tri(meth)acrylate.

The (meth)acrylate monomer may have a partially modified molecular skeleton. The (meth)acrylate monomer used can be modified with ethylene oxide, propylene oxide, caprolactone, isocyanuric acid, alkyl, cyclic alkyl, an aromatic compound, bisphenol, or the like.

Examples of the polyfunctional (meth)acrylate oligomer include acrylate polymers such as urethane (meth)acrylate, epoxy (meth)acrylate, polyester (meth)acrylate, and polyether (meth)acrylate.

The urethane (meth)acrylate is obtained, for example, through the reaction of a polyhydric alcohol and organic diisocyanate with hydroxy (meth)acrylate.

The epoxy (meth)acrylate is preferably (meth)acrylate obtained by reacting trifunctional or higher aromatic epoxy resin, alicyclic epoxy resin, aliphatic epoxy resin, or the like with (meth)acrylic acid, (meth)acrylate obtained by reacting difunctional or higher aromatic epoxy resin, alicyclic epoxy resin, aliphatic epoxy resin, or the like with polybasic acid and (meth)acrylic acid, or (meth)acrylate obtained by reacting difunctional or higher aromatic epoxy resin, alicyclic epoxy resin, aliphatic epoxy resin, or the like with a phenol and (meth)acrylic acid.

These ionizing radiation-curable compounds can be used alone or in combination of two or more.

When the ionizing radiation-curable compound is an ultraviolet-curable compound, the ionizing radiation-curable composition preferably contains an additive such as a photopolymerization initiator or a photopolymerization accelerator.

The photopolymerization initiator is one or more members selected from the group consisting of acetophenone, benzophenone, α-hydroxyalkylphenone, Michler's ketone, benzoin, benzyl methyl ketal, benzoyl benzoate, α-acyloxime ester, thioxanthones, and the like.

The melting point of the photopolymerization initiator is preferably 100° C. or higher. When the melting point of the photopolymerization initiator is 100° C. or higher, a residual photopolymerization initiator is sublimated in the course of production of the writing sheet or in the course of formation of a transparent conductive film of a touch panel. Thus, the contamination of the production apparatus or the transparent conductive film can be prevented.

The photopolymerization accelerator can reduce the inhibition of polymerization by air during curing and accelerate a curing rate. The photopolymerization accelerator is, for example, one or more members selected from the group consisting of p-dimethylaminobenzoic acid isoamyl ester, p-dimethylaminobenzoic acid ethyl ester, and the like.

In the resin layer-forming application liquid, a solvent is usually used for adjusting a viscosity or for allowing each component to be dissolved or dispersed. The surface state of the resin layer after application and drying differs depending on the type of the solvent. Therefore, it is preferred to select the solvent in consideration of the saturated vapor pressure of the solvent, the permeability of the solvent into a transparent base material, etc. Specifically, examples of the solvent can include ketones (acetone, methyl ethyl ketone, methyl isobutyl ketone, cyclohexanone, etc.), ethers (dioxane, tetrahydrofuran, etc.), aliphatic hydrocarbons (hexane, etc.), alicyclic hydrocarbons (cyclohexane, etc.), aromatic hydrocarbons (toluene, xylene, etc.), halocarbons (dichloromethane, dichloroethane, etc.), esters (methyl acetate, ethyl acetate, butyl acetate, etc.), alcohols (butanol, cyclohexanol, etc.), cellosolves (methylcellosolve, ethylcellosolve, etc.), cellosolve acetates, sulfoxides (dimethyl sulfoxide, etc.), and amides (dimethylformamide, dimethylacetamide, etc.). A mixture thereof may be used.

When the drying of the solvent is too slow, it is difficult to form a surface shape that easily satisfies the conditions (B1) and (B2) due to excessive leveling properties of the resin layer. Thus, for the solvent, it is preferred that a solvent having an evaporation rate (relative evaporation rate to the evaporation rate of n-butyl acetate defined as 100) of 180 or more should be contained at 50% by mass or more, more preferably 60% by mass or more, in all solvents. Examples of the solvent having a relative evaporation rate of 180 or more include toluene. The relative evaporation rate of toluene is 195.

It is preferred that the resin layer-forming application liquid should contain a leveling agent, from the viewpoint of rendering the surface shape moderately smooth and easily adjusting the surface shape of the writing sheet to the range mentioned above. Examples of the leveling agent include fluorine leveling agents, silicone leveling agents, and fluorine-silicone copolymer leveling agents. The amount of the leveling agent added is preferably 0.01 to 0.50% by weight, more preferably 0.10 to 0.40% by weight, further preferably 0.20 to 0.30% by mass, with respect to the total solid content of the resin layer-forming application liquid.

A plastic film is suitable as the base material.

The plastic film can be formed from a resin such as polyester, triacetylcellulose (TAC), cellulose diacetate, cellulose acetate butyrate, polyamide, polyimide, polyethersulfone, polysulfone, polypropylene, polymethylpentene, polyvinyl chloride, polyvinyl acetal, polyether ketone, polymethyl methacrylate, polycarbonate, polyurethane and cyclo-olefin-polymer (COP).

Among these plastic films, a polyester film processed by orienting, particularly, biaxial orienting, is preferred from the viewpoint of mechanical strength and dimensional stability and from the viewpoint of easily satisfying the physical property (f). The polyester film is preferably polyethylene terephthalate or polyethylene naphthalate.

The thickness of the base material is preferably 5 to 200 μm, more preferably 10 to 150 μm.

[Touch Panel]

The touch panel of embodiment B is a touch panel comprising a sheet on a surface, wherein the writing sheet for a touch panel pen of embodiment B is placed as the sheet such that the side that satisfies the conditions (B1) and (B2) faces the surface of the touch panel.

Examples of the touch panel include resistive touch panels, capacitive touch panels, in-cell touch panels, optical touch panels, ultrasonic touch panels and electromagnetic touch panels.

Figure 12:
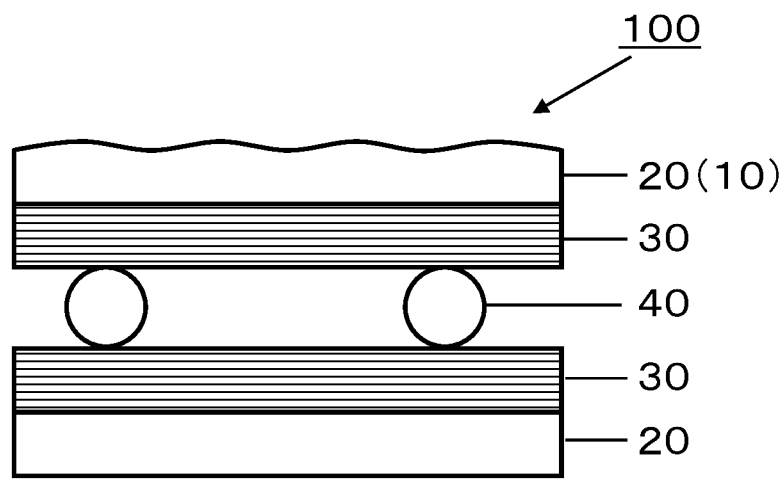
FIG. 12 is a cross-sectional view showing one embodiment of the touch panel of the present invention.

Resistive touch panel 100, as shown in FIG. 12, is prepared by connecting a circuit (not shown) to a basic configuration in which a pair of transparent substrates 20 (upper and lower transparent substrates) having conductive films 30 are placed via spacer 40 such that the conductive films 30 face each other.

Examples of the configuration of the resistive touch panel include a configuration in which the writing sheet 10 of embodiment B is used as the upper transparent substrate 20 such that the side that satisfies the conditions (B1) and (B2) in the writing sheet 10 faces the surface of the touch panel 100. Although not shown, the resistive touch panel may have a configuration in which the writing sheet of embodiment B is laminated on the upper transparent substrate such that the side that satisfies the conditions (B1) and (B2) faces the surface, or a configuration in which the writing sheet of embodiment B is placed on the upper transparent substrate such that the side that satisfies the conditions (B1) and (B2) faces the surface, and the writing sheet is fixed using a frame or the like.

Figure 13:
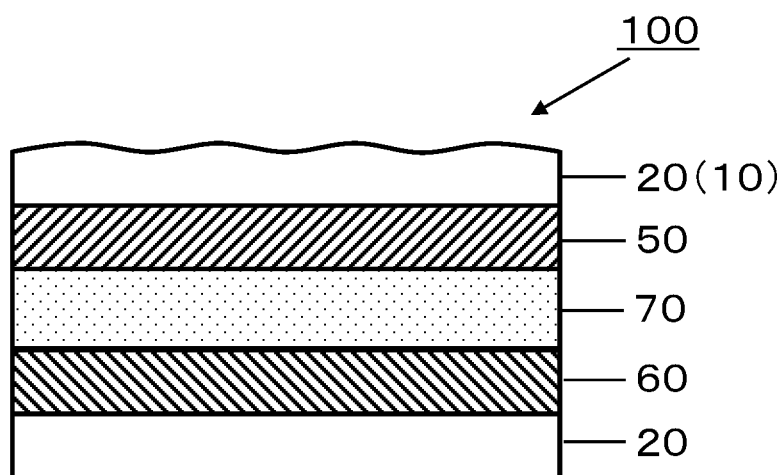
FIG. 13 is a cross-sectional view showing another embodiment of the touch panel of the present invention.

Examples of the capacitive touch panel include surface capacitive touch panels and projected capacitive touch panels. Projected capacitive touch panels are often used. The projected capacitive touch panel is prepared by connecting a circuit to a basic configuration in which an X-axis electrode and a Y-axis electrode that intersects the X-axis electrode are placed via an insulator. More specifically, examples of the basic configuration include a form in which the X-axis electrode and the Y-axis electrode are formed on separate sides of one transparent substrate, a form in which the X-axis electrode, the insulator layer, and the Y-axis electrode are formed in this order on the transparent substrate, and a form as shown in FIG. 13 in which: X-axis electrode 50 is formed on transparent substrate 20; Y-axis electrode 60 is formed on another transparent substrate 20; and these are laminated via insulator layer 70 such as an adhesive layer. Another example thereof includes a form in which an additional transparent substrate is further laminated on any of these basic forms.

Examples of the configuration of the capacitive touch panel include a configuration in which the writing sheet 10 of embodiment B is used as the transparent substrate 20 on the surface side such that the side that satisfies the conditions (B1) and (B2) in the writing sheet 10 faces the surface of the touch panel 100. Although not shown, the capacitive touch panel may have a configuration in which the writing sheet of embodiment B is laminated on the transparent substrate on the surface side such that the side that satisfies the conditions (B1) and (B2) faces the surface, or a configuration in which the writing sheet of embodiment B is placed on the transparent substrate on the surface side such that the side that satisfies the conditions (B1) and (B2) faces the surface, and the writing sheet is fixed using a frame or the like.

The electromagnetic touch panel is a touch panel that employs a dedicated pen generating a magnetic field. The electromagnetic touch panel has at least a sensor unit which detects electromagnetic energy generated from the pen and further has a transparent substrate on the sensor unit. The transparent substrate may have a multilayer structure.

Examples of the configuration of the electromagnetic touch panel include a configuration in which the writing sheet of embodiment B is used as an uppermost-surface transparent substrate among the transparent substrates positioned on the sensor unit such that the side that satisfies the conditions (B1) and (B2) in the writing sheet faces the surface of the touch panel. Alternatively, the electromagnetic touch panel may have a configuration in which the writing sheet of embodiment B is laminated on the uppermost-surface transparent substrate among the transparent substrates positioned on the sensor unit such that the side that satisfies the conditions (B1) and (B2) faces the surface, or a configuration in which the writing sheet of embodiment B is placed on the uppermost-surface transparent substrate such that the side that satisfies the conditions (B1) and (B2) faces the surface, and the writing sheet is fixed using a frame or the like.

The in-cell touch panel has, for example, resistive, capacitive, or optical touch panel functions incorporated inside a liquid-crystal element prepared by sandwiching liquid crystals between two glass substrates.

Examples of the configuration of the in-cell touch panel include a configuration in which the writing sheet of embodiment B is placed on the glass substrate on the surface side such that the side that satisfies the conditions (B1) and (B2) faces the surface of the touch panel. The in-cell touch panel may have an additional layer such as a polarizer between the glass substrate on the surface side and the writing sheet of embodiment B.

[Touch Panel System]

The touch panel system of embodiment B is a touch panel system comprising: a touch panel comprising a writing sheet for a touch panel pen on a surface; and a touch panel pen, wherein the touch panel system satisfies the following conditions (B1) and (B2):

<Condition (B1)> the touch panel pen is fixed in contact at an angle of 60 degrees with the surface of the writing sheet for a touch panel pen; while a vertical load of 100 gf is applied to the touch panel pen, the writing sheet for a touch panel pen is moved 40 mm in one-way length at a rate of 14 mm/sec; friction force on the touch panel pen in the direction of the movement is measured at 0.001-second intervals to calculate kinetic friction force $F_k$; and when a standard deviation of the $F_k$ is calculated, the standard deviation is 3.0 gf or more and 11.0 gf or less; and <Condition (B2)> after the completion of the movement of 40 mm in one-way length of the writing sheet for a touch panel pen under the condition (B1), the vertical load of 100 gf applied to the touch panel pen is maintained, and the touch panel pen is kept in contact at an angle of 60 degrees with the surface of the writing sheet for a touch panel pen; in this state, friction force on the touch panel pen in the direction of the movement is regarded as residual friction force $F_{re}$; and when the $F_{re}$ is measured at 0.001 second-intervals, the $F_{re}$ is 4.5 gf or more and 15.0 gf or less on average.

In the touch panel system of embodiment B, examples of the embodiments of the touch panel, the writing sheet for a touch panel pen, and the touch panel pen include the same as the embodiments shown in the aforementioned method for selecting a writing sheet for a touch panel pen, writing sheet for a touch panel pen, and touch panel according to embodiment B.

The touch panel system of embodiment B can impart a high level of writing feeling to the touch panel.

[Display Device with Touch Panel]

The display device with a touch panel of embodiment B is a display device comprising the touch panel on a display element, wherein the touch panel is the touch panel of embodiment B.

Examples of the display element include liquid-crystal display elements, EL display elements, plasma display elements, and electronic paper elements. When the display element is a liquid-crystal display element, an EL display element, a plasma display element, or an electronic paper element, the touch panel of embodiment B is placed on this display element.

The display device with a touch panel of embodiment B can provide a high level of writing feeling.

EXAMPLES

Next, the present invention will be described in more detail with reference to Examples. However, the present invention is not limited by these examples by any means.

Examples of Embodiment A

A1. Measurement and Evaluation

A writing sheet for a touch panel pen prepared in each of Examples and Comparative Examples was measured and evaluated as described below. The results are shown in Table 1 or 2.

A1-1. Surface Shape Measurement

The writing sheet for a touch panel of each of Examples and Comparative Examples was cut into 10 cm square. The cutting locations were selected from random sites after visual confirmation that abnormalities such as waste or flaws were absent. The cut surface member was laminated onto a black plate (manufactured by Kuraray Co., Ltd., trade name: COMOGLAS, model number: DFA502K, thickness: 2.0 mm) having a size of 10 cm in length×10 cm in width via an optical transparent pressure-sensitive adhesive sheet (refractive index: 1.47, thickness: 100 μm) manufactured by Toray Industries, Inc. 20 such samples were provided for each example.

Each sample was loaded on a measuring stage using a surface roughness tester (trade name: SE-3400) manufactured by Kosaka Laboratory Ltd. so as to be fixed in close contact therewith. Then, the surface shape on the resin layer side of each sample was measured as to measurement items described below under measurement conditions described below. Then, average values from the 20 samples were used as maximum peak height Rp of a roughness curve, maximum valley depth Rv of the roughness curve, arithmetic average roughness Ra and average wavelength λa in each of Examples and Comparative Examples.

<Measurement Conditions>
[Probe of Surface Roughness Detection Unit]
SE3400 (trade name) manufactured by Kosaka Laboratory Ltd. (radius of curvature of the tip: 2 μm, apex angle: 90 degrees, material: diamond)
[Measurement Conditions of Surface Roughness Tester]
Evaluation length: cutoff value λc×5
Preliminary length: cutoff value λc×2
Probe speed: 0.5 mm/s
Longitudinal magnification: ×2000
Lateral magnification: ×10
Cutoff value: 0.8 mm
Skid: not used (no contact with measuring surface)
Cutoff filter type: Gaussian
Dead band level: 10%
tp/PC curve: normal A1-2. Haze The writing sheet for a touch panel of each of Examples and Comparative Examples was cut into 5 cm square. 20 such samples were provided for each example. The 20 sites were selected from random sites after visual confirmation that abnormalities such as waste or flaws were absent.

The haze (overall haze) of each sample was measured according to JIS K-7136: 2000 using a haze meter (HM-150, manufactured by Murakami Color Research Laboratory Co., Ltd.). The surface of light incidence was set to the plastic film side.

A1-3. Writing Feeling

A surface opposite to the resin layer side of the writing sheet for a touch panel pen was laminated onto a glass plate via an optical transparent pressure-sensitive adhesive sheet (thickness: 100 μm) manufactured by Toray Industries, Inc., and evaluated for writing feeling according to criteria given below using touch panel pens A1 to A3 described below. Scores 3 to 5 were accepted. Score 4 is best. Score 5 is second best.

The atmosphere for the evaluation involved a temperature of 23° C.±5° C. and a humidity of 50%±10%. Before the start of the evaluation, each sample was left in an atmosphere involving 23° C.±5° C. and a humidity of 50%±10% for 10 minutes or longer.

1: Slip
2: Slightly slip
3: A feel as if to write with a ball pen on paper
4: A feel as if to write with a pencil on paper (pencil-like writing feeling)
5: Similar to pencil-like writing feeling, but a slightly heavy feel
6: Too heavy <Touch Panel Pen A1>
Trade name "Nintendo DS Stylus NTR-004" manufactured by Nintendo Co., Ltd.
Angled part of the tip region: present
θmax of the tip region: 43 degrees
Volumetric change of the tip region upon application of a vertical load of 100 gf·1.0% or less
Raw material of the tip region: ABS resin (Young's modulus: 1.9 to 2.8 GPa) alone
Nib diameter: 2.0 mm <Touch Panel Pen A2>
Trade name "Active Electrostatic Pen IPCZ131A" manufactured by Toshiba Corp.
Angled part of the tip region: present
Angle formed by non-curved and curved surfaces of the tip region: 40 degrees
Volumetric change of the tip region upon application of a vertical load of 100 gf· more than 1.0%
Raw material of the tip region: a mixture of melamine resin (Young's modulus: 7.6 GPa) and acrylonitrile (Young's modulus: 0.003 GPa). The ratio of the melamine resin to all raw materials of the tip region was 50% by mass or more.
Nib diameter: 0.8 mm <Touch Panel Pen A3>
Pen attached to an electronic notebook (trade name: BB-2) manufactured by King Jim Co., Ltd.
Angled part of the tip region: absent Volumetric change of the tip region upon application of a vertical load of 100 gf·1.0% or less
Raw material of the tip region: polyacetal (Young's modulus: 3.6 GPa) alone Nib diameter: 1.4 mm
(Among the touch panel pens A1 to A3, the touch panel pen A1 satisfies the conditions for the touch panel pen (A))

1-4. Viewability

The writing sheet for a touch panel pen was placed on commercially available electronic paper (manufactured by Sony Corp., trade name: DPT-S1) such that the resin layer side faced the surface. The writing sheet was evaluated for viewability for the character information of the electronic paper under illumination with a fluorescent lamp (brightness of the writing sheet: 500 lux). A sample with the character information favorably viewable was given "A", and a sample with the character information less viewable was given "B".

A: There were no reflections of the fluorescent lamp, and blurs of the characters can be enough to be ignored.
B: Sufficiently usable, though there were slight reflections of the fluorescent lamp or slight blurs of the characters.
C: Not usable, due to severe reflections of the fluorescent lamp or too blurry characters.

A2. Preparation of Writing Sheet for Touch Panel Pen

Example A1

Resin layer application liquid A1 having the formulation described below was applied onto a plastic film (triacetylcellulose film having a thickness of 80 µm) such that the thickness after drying was 2 µm. A resin layer was formed by drying (70° C., 30 sec, wind speed: 5 m/s) and ultraviolet irradiation to obtain a writing sheet for a touch panel pen.

<Resin Layer Application Liquid A1>

| | |
|---|---|
| Pentaerythritol triacrylate | 60 parts |
| Dipentaerythritol hexaacrylate | 40 parts |
| Organic particles | 15 parts |
| (spherical polystyrene, average particle size: 9.0 µm) | |
| Photopolymerization initiator | 3 parts |
| (manufactured by BASF SE, Irgacure 184) | |
| Fluorine-silicone copolymer leveling agent | 0.2 parts |
| (manufactured by Shin-Etsu Chemical Co., Ltd., X-71-1203M) | |
| Solvent 1 (toluene) | 20 parts |
| Solvent 2 (cyclohexanone) | 24 parts |
| Solvent 3 (methyl isobutyl ketone) | 156 parts |

Example A2

A writing sheet for a touch panel pen was obtained in the same way as in Example A2 except that the thickness of the resin layer was changed to 3 µm.

Example A3

A writing sheet for a touch panel pen was obtained in the same way as in Example A2 except that the thickness of the resin layer was changed to 4 µm.

Example A4

A writing sheet for a touch panel pen was obtained in the same way as in Example A1 except that: the resin layer application liquid A1 was changed to resin layer application liquid A2 having the formulation described below; and the thickness of the resin layer was changed to 3 µm.

<Resin Layer Application Liquid A2>

| | |
|---|---|
| Pentaerythritol triacrylate | 60 parts |
| Dipentaerythritol hexaacrylate | 40 parts |
| Organic particles | 30 parts |
| (spherical acryl, average particle size: 12.0 µm) | |
| Photopolymerization initiator | 3 parts |
| (manufactured by BASF SE, Irgacure 184) | |
| Fluorine-silicone copolymer leveling agent | 0.2 parts |
| (manufactured by Shin-Etsu Chemical Co., Ltd., X-71-1203M) | |
| Solvent 1 (toluene) | 173 parts |
| Solvent 2 (cyclohexanone) | 24 parts |
| Solvent 3 (methyl isobutyl ketone) | 3 parts |

Example A5

A writing sheet for a touch panel pen was obtained in the same way as in Example A4 except that the thickness of the resin layer was changed to 5 µm.

Example A6

A writing sheet for a touch panel pen was obtained in the same way as in Example A4 except that the thickness of the resin layer was changed to 6 µm.

Example A7

A writing sheet for a touch panel pen was obtained in the same way as in Example A1 except that: the plastic film was changed to a PET film having a thickness of 80 µm; and the resin layer application liquid A1 was changed to resin layer application liquid A3 having the formulation described below.

<Resin Layer Application Liquid A3>

| | |
|---|---|
| Pentaerythritol triacrylate | 93 parts |
| Inorganic fine particles | 7 parts |
| (manufactured by Fuji Silysia Chemical Ltd., amorphous silica obtained by the gel method) | |
| (hydrophobized, average particle size: 4.1 µm) | |
| Photopolymerization initiator | 5 parts |
| (manufactured by BASF SE, Irgacure 184) | |
| Silicone leveling agent | 0.001 parts |
| (manufactured by Momentive Performance Materials Inc., TSF4460) | |
| Solvent 1 (methyl isobutyl ketone) | 50 parts |
| Solvent 2 (methyl ethyl ketone) | 50 parts |
| Solvent 3 (isopropyl alcohol) | 50 parts |
| Solvent 4 (N-butanol) | 50 parts |

Comparative Example A1

A writing sheet for a touch panel pen was obtained in the same way as in Example A1 except that: the resin layer application liquid A1 was changed to resin layer application liquid A4 having the formulation described below; and the thickness of the resin layer was changed to 5 µm.

<Resin Layer Application Liquid A4>

| | |
|---|---|
| Pentaerythritol triacrylate | 60 parts |
| Dipentaerythritol hexaacrylate | 40 parts |
| Organic particles | 30 parts |
| (spherical acryl, average particle size: 14.0 m) | |
| Photopolymerization initiator | 3 parts |
| (manufactured by BASF SE, Irgacure 184) | |
| Fluorine-silicone copolymer leveling agent | 0.2 parts |
| (manufactured by Shin-Etsu Chemical Co., Ltd., X-71-1203M) | |

-continued

| Solvent 1 (toluene) | 173 parts |
| Solvent 2 (cyclohexanone) | 24 parts |
| Solvent 3 (methyl isobutyl ketone) | 3 parts |

Comparative Example A2

A writing sheet for a touch panel pen was obtained in the same way as in Comparative Example A1 except that the thickness of the resin layer was changed to 6 μm.

Comparative Examples A3 to A6

Commercially available sheets A to D were provided as writing sheets for a touch panel pen of Comparative Examples A3 to A6.

TABLE 1

| | | Example | | | | | | |
|---|---|---|---|---|---|---|---|---|
| | | A1 | A2 | A3 | A4 | A5 | A6 | A7 |
| Surface shape (μm) | Rp | 5.4 | 5.3 | 4.8 | 7.8 | 7.4 | 7.7 | 2.6 |
| | Rv | 3.2 | 3.7 | 3.9 | 5.1 | 4.6 | 4.8 | 1 |
| | λa | 233 | 239 | 259 | 179 | 189 | 159 | 49 |
| | Ra | 1.6 | 1.7 | 1.5 | 2.3 | 2.1 | 2.0 | 0.4 |
| Haze (%) | | 46.3 | 44.5 | 41.6 | 72.3 | 67.5 | 66.7 | 23 |
| Writing feeling | Pen A1 | 4 | 4 | 4 | 5 | 5 | 5 | 3 |
| | Pen A2 | 3 | 3 | 4 | 4 | 4 | 4 | 3 |
| | Pen A3 | 3 | 4 | 4 | 4 | 4 | 4 | 3 |
| Viewability | | A | A | A | B | B | B | A |

TABLE 2

| | | Comparative Example | | | | | |
|---|---|---|---|---|---|---|---|
| | | A1 | A2 | A3 | A4 | A5 | A6 |
| Surface shape (μm) | Rp | 9.0 | 10.0 | 1.6 | 0.6 | 0.1 | 0.7 |
| | Rv | 5.5 | 5.2 | 0.7 | 0.3 | 0.1 | 0.5 |
| | λa | 147 | 130 | 722 | 36 | 521 | 91 |
| | Ra | 2.2 | 2.4 | 0.3 | 0.1 | 0.02 | 0.2 |
| Haze (%) | | 75.2 | 75.4 | 79.6 | 8.6 | 0.7 | 4.6 |
| Writing feeling | Pen A1 | 6 | 6 | 1 | 1 | 1 | 1 |
| | Pen A2 | 5 | 5 | 2 | 3 | 2 | 3 |
| | Pen A3 | 6 | 6 | 1 | 1 | 1 | 1 |
| Viewability | | C | C | C | C | C | C |

From the results of Tables 1 and 2, it can be confirmed that the writing sheets of Examples A1 to A7 which satisfy the conditions (A1) to (A3) can produce pencil-like writing feeling when touch panel pen A1 which satisfies the conditions for the touch panel pen (A) is used.

Examples of Embodiment B

B1. Measurement and Evaluation

A writing sheet for a touch panel pen prepared or provided in each of Experimental Examples was measured and evaluated as described below. The results are shown in Table 3.

B1-1. Friction Force

As shown in FIG. 7, each of touch panel pens B1 to B4 described below was fixed by a holding fixture, in contact at an angle of 60 degrees with the surface on the resin layer side of each writing sheet for a touch panel pen. 100 g of a weight was placed on the base on the upper part of the holding fixture, and a vertical load of 100 gf was applied to the touch panel pen. Under the load, the movable mount with the writing sheet fixed thereon was moved at a rate of 14 mm/sec to the obtuse direction side (left side of FIG. 7) of an angle formed by the movable mount and the touch panel pen. When the movable mount was moved 40 mm in one-way length, friction force on the pen in the direction of the movement was measured. After the completion of the movement of the movable mount, the touch panel pen was kept in contact at an angle of 60 degrees with the surface of the writing sheet, while the vertical load applied to the touch panel pen was canceled. In this state, residual friction force $F_{re}$ on the touch panel pen in the direction of the movement was measured.

The measurement apparatus used was trade name "HEIDON-14DR" manufactured by Shinto Scientific Co., Ltd. The mode was set to "one-way friction measurement mode under constant load", and the friction force measurement intervals were set to 0.001 seconds. The atmosphere for the measurement involved a temperature of 23° C.±5° C. and a humidity of 50%±10%. Before the start of the measurement, each sample was left in an atmosphere involving 23° C.±5° C. and a humidity of 50%±10% for 10 minutes or longer.

The standard deviation of the kinetic friction force $F_k$, the kinetic friction force $F_k$ on average, and the residual friction force $F_{re}$ on average were calculated according to the procedures mentioned above in (A) to (E). Average values from 20 samples each measured once were used as the standard deviation of the kinetic friction force $F_k$, the kinetic friction force $F_k$ on average, and the residual friction force $F_{re}$ on average in each of Examples and Comparative Examples.

<Touch Panel Pen B1>

Touch panel pen B attached to trade name "Surface Pro 4" manufactured by Microsoft Corp.

Configuration of the tip region: a complex in which a mixture of a urethane resin binder and polyester fibers (region (ii) providing hardness) and air holes (region (i) promoting deformation) coexisted.

Volume ratio between the region (i) and the region (ii): approximately 87:13

Young's modulus of the region (i): 2 GPa

Nib diameter: 1.2 mm

<Touch Panel Pen B2>

Touch panel pen attached to trade name "Dynabook Tab S68" manufactured by Toshiba Corp.

Configuration of the tip region: a complex in which air holes (region (i) promoting deformation) were mixed into an assembly of polyester fibers (region (ii) providing hardness).

Young's modulus of the region (i): 3.0 GPa

Volume ratio between the region (i) and the region (ii): approximately 95:5

Nib diameter: 1.5 mm

<Touch Panel Pen B3>

Touch panel pen attached to trade name "Surface Pro 3" manufactured by Microsoft Corp.

Configuration of the tip region: bulk polyacetal resin (POM)

Nib diameter: 1.6 mm

<Touch Panel Pen B4>

Touch panel pen attached to trade name "iPad Pro" manufactured by Apple Inc. Configuration of the tip region: bulk nylon resin Nib diameter: 2.0 mm B1-2. Measurement of Surface Shape The writing sheet for a touch panel of each of Examples and Comparative Examples was cut into 10 cm square. The cutting locations were selected from random sites after visual confirmation that abnormalities such as waste or flaws were absent. The cut surface member was laminated onto a black plate (manufactured by Kuraray Co., Ltd., trade name: COMOGLAS, model number: DFA502K, thickness: 2.0 mm) having a size of 10 cm in length×10 cm in width via an optical transparent pressure-sensitive adhesive sheet (refractive index: 1.47, thickness: 100 μm) manufactured by Toray Industries, Inc. 20 such samples were provided for each example.

Each sample was loaded on a measuring stage using a surface roughness tester (model number: SE-3400, manufactured by Kosaka Laboratory Ltd.) so as to be fixed in close contact therewith. Then, the surface shape on the resin layer side of each sample was measured as to measurement items described below under measurement conditions described below. Then, average values from the 20 samples were used as Rt, θa and λa in each of Examples and Comparative Examples.

<Measurement Conditions>
[Probe of Surface Roughness Detection Unit]
SE2555N (trade name) manufactured by Kosaka Laboratory Ltd. (radius of curvature of the tip: 2 μm, apex angle: 90 degrees, material: diamond)
[Measurement Conditions of Surface Roughness Tester]
Evaluation length: cutoff value λc×5
Preliminary length: cutoff value λc×2
Probe speed: 0.5 mm/s
Longitudinal magnification: ×2000
Lateral magnification: ×10
Skid: not used (no contact with measuring surface)
Cutoff filter type: Gaussian
Dead band level: 10%
tp/PC curve: normal
<Measurement Items>
Maximum profile height Rt of a roughness curve defined in JIS B0601: 2001 with a cutoff value of 0.8 mm
Average tilt angle θa with a cutoff value of 0.8 mm
Average wavelength λa with a cutoff value of 0.8 mm B1-3. Area Ratio of Particles and Density of Particles
(1) SEM Planar Photographing
A SEM planar photograph of the writing sheet surface was taken under a digital scanning electron microscope (model number: S-4800) manufactured by Hitachi Kyowa Engineering Co., Ltd. at a magnification of ×50000 (accelerating voltage: 30.0 kV, emission current: 10 μA).
(2) Calculation of Area Ratio and Particle Density
The image was binarized from the digital data of the SEM photograph using image analysis software (trade name: WinRoof, manufactured by Mitani Corp.), and particle parts were selected to calculate the area ratio (%) and particle density (the number of particles/100 μm square) of the particles.

B1-4. Martens' Hardness of Writing Sheet
20 samples having a pressure-sensitive adhesive layer (storage elastic modulus at 23° C. of the pressure-sensitive adhesive constituting the pressure-sensitive adhesive layer: 0.8 GPa) with a thickness of 50 μm formed on a surface opposite to the resin layer side of the base material of the writing sheet were prepared.

An ultra-microhardness tester (manufactured by Helmut Fischer GmbH, trade name: HM500) was used. A diamond indenter was pressed against each sample from the resin layer side until an indentation depth of 3 μm, while a load was continuously increased. The indentation depth of 3 μm was kept for 10 seconds. Then, the Martens' hardness (N/mm$^2$) was measured. An average value from the 20 samples was used as the Martens' hardness in each of Examples and Comparative Examples. The indentation depth was continuously increased so as to reach 3 μm from 0 μm in 90 seconds.

B1-5. Haze and Total Light Transmittance
The writing sheet for a touch panel of each of Examples and Comparative Examples was cut into 5 cm square. 20 such samples were provided for each example. The 20 sites were selected from random sites after visual confirmation that abnormalities such as waste or flaws were absent.

The haze (JIS K-7136: 2000) and total light transmittance (JIS K7361-1: 1997) of each sample were measured using a haze meter (HM-150, manufactured by Murakami Color Research Laboratory Co., Ltd.). Average values from the 20 samples were used as the haze and the total light transmittance in each of Examples and Comparative Examples. The surface of light incidence was set to the base material side.

B1-6. Pencil Hardness
The pencil hardness of the writing surface of the writing sheet was measured in conformity with JIS K5600-5-4: 1999 under conditions involving a load of 500 gf and a rate of 1.4 mm/sec.

B1-7. Writing Feeling
A surface opposite to the resin layer side of the writing sheet for a touch panel pen was laminated onto a glass plate via an optical transparent pressure-sensitive adhesive sheet (thickness: 100 μm) manufactured by Toray Industries, Inc., and evaluated for writing feeling using touch panel pens B1 to B4 described above. The writing feeling was evaluated as to two items: writing feeling in drawing a straight line, and writing feeling in halting writing for a moment and changing the direction. 20 persons graded samples such that: a sample that offered favorable writing feeling as a whole was given 2; a sample that offered normal writing feeling as a whole was given 1; and a sample that offered unfavorable writing feeling as a whole was given 0. A sample with an average score of 1.8 or higher from the 20 persons was given AA; a sample with an average score of 1.6 or higher and lower than 1.8 was given A; a sample with an average score of 1.0 or higher and lower than 1.6 was given B; and a sample with an average score of lower than 1.0 was given C.

The atmosphere for the evaluation involved a temperature of 23° C.±5° C. and a humidity of 50%±10%. Before the start of the evaluation, each sample was left in an atmosphere involving 23° C.±5° C. and a humidity of 50%±10% for 10 minutes or longer.

B1-8. Nib Wear
As shown in FIG. 7, each of touch panel pens B1 to B4 was fixed by a holding fixture, in contact at an angle of 60 degrees with the surface on the resin layer side of each writing sheet for a touch panel pen. 100 g of a weight was placed on the base on the upper part of the holding fixture, and a vertical load of 100 gf was applied to the touch panel pen. Under the load, the movable mount with the writing sheet fixed thereon was moved 40 mm in one-way length at a rate of 14 mm/sec so as to attain 200 repetitive reciprocating motions.

Evaluation criteria were: (i) change of kinetic friction force under measurement from the initial kinetic friction force was 40% or less; and (ii) the nib wear of the touch panel pen was not readily detectable by visual observation. A sample that satisfied the criteria (i) and (ii) was given "A"; a sample that did not satisfy any of the criteria (i) and (ii) was given "B"; and a sample that satisfied neither the criteria (i) nor (ii) was given "C".

The measurement apparatus used was trade name "HEIDON-14DR" manufactured by Shinto Scientific Co., Ltd. The mode was set to "reciprocating friction measurement mode under constant load", and the evaluation temperature was set to 23° C.

B2. Preparation of Writing Sheet for Touch Panel Pen

Experimental Example B1

The base material used was a polyethylene terephthalate film (thickness: 100 μm, manufactured by Toyobo Co., Ltd., trade name: A4300, Martens' hardness at an indentation depth of 3 μm: 155 N/mm$^2$). Resin layer application liquid B1 having the formulation described below was applied onto the base material such that the thickness after drying was 3 μm. A resin layer was formed by drying and ultraviolet irradiation to obtain a writing sheet for a touch panel pen.

<Resin Layer Application Liquid B1>

| | |
|---|---|
| Pentaerythritol triacrylate | 60 parts |
| Dipentaerythritol hexaacrylate | 40 parts |
| Organic particles (spherical polystyrene particles, average particle size: 3.0 μm, coefficient of variation: 20%) | 20 parts |
| Photopolymerization initiator (manufactured by BASF SE, trade name: Irgacure 184) | 5 parts |
| Silicone leveling agent (manufactured by Momentive Performance Materials Inc., trade name: TSF4460) | 0.2 parts |
| Solvent 1 (toluene) | 90 parts |
| Solvent 2 (methyl isobutyl ketone) | 10 parts |

Experimental Example B2

The base material used was a polyethylene terephthalate film (thickness: 100 μm, manufactured by Toyobo Co., Ltd., trade name: A4300, Martens' hardness at an indentation depth of 3 μm: 155 N/mm$^2$). First resin layer application liquid B2 having the formulation described below was applied onto the base material such that the thickness after drying was 8 μm. A first resin layer was formed by drying and ultraviolet irradiation. Subsequently, second resin layer application liquid B3 having the formulation described below was applied onto the first resin layer such that the thickness after drying was 3 μm. A second resin layer was formed by drying and ultraviolet irradiation to obtain a writing sheet for a touch panel pen.

<First Resin Layer Application Liquid B2>

| | |
|---|---|
| Pentaerythritol triacrylate | 60 parts |
| Dipentaerythritol hexaacrylate | 40 parts |
| Photopolymerization initiator (manufactured by BASF SE, trade name: Irgacure 184) | 4 parts |
| Solvent 1 (methyl isobutyl ketone) | 90 parts |
| Solvent 2 (methyl ethyl ketone) | 10 parts |

<Second Resin Layer Application Liquid B3>

| | |
|---|---|
| Acrylic monomer | 65 parts |
| Organic particles (spherical polystyrene particles, average particle size: 3.0 μm, coefficient of variation: 20%) | 25 parts |
| Photopolymerization initiator (manufactured by BASF SE, Irgacure 184) | 5 parts |
| Fluorine leveling agent (manufactured by DIC Corp., Megafac RS-75) | 0.3 parts |
| Solvent 1 (toluene) | 125 parts |
| Solvent 2 (methyl isobutyl ketone) | 10 parts |

Experimental Example B3

The base material used was a triacetylcellulose film (thickness: 80 μm), Martens' hardness at an indentation depth of 3 μm: 190 N/mm$^2$). The first resin layer application liquid B2 described above was applied onto the base material such that the thickness after drying was 8 μm. A first resin layer was formed by drying and ultraviolet irradiation. Subsequently, second resin layer application liquid B4 having the formulation described below was applied onto the first resin layer such that the thickness after drying was 6 μm. A second resin layer was formed by drying and ultraviolet irradiation to obtain a writing sheet for a touch panel pen.

<Second Resin Layer Application Liquid B4>

| | |
|---|---|
| Pentaerythritol triacrylate | 60 parts |
| Dipentaerythritol hexaacrylate | 40 parts |
| Organic particles (spherical polystyrene particles, average particle size: 10.0 μm) | 12.5 parts |
| Photopolymerization initiator (manufactured by BASF SE, trade name: Irgacure 184) | 4 parts |
| Benzotriazole ultraviolet absorber | 2.5 parts |
| Fluorine leveling agent (manufactured by DIC Corp., Megafac RS-75) | 0.3 parts |
| Solvent 1 (isopropyl alcohol) | 20 parts |
| Solvent 2 (methyl isobutyl ketone) | 80 parts |

Experimental Examples B4 and B51

Commercially available touch panel surface films having a resin layer containing particles on a polyethylene terephthalate film were provided as writing sheets for a touch panel pen of Experimental Examples B4 and B5.

Experimental Example B4 (manufactured by Sony Corp., trade name: Friction Sheet DPT-S1)

Experimental Example B5 (manufactured by Nakabayashi Co., Ltd., trade name: liquid-crystal protective film TBF-SEP14FLH)

TABLE 3

| | | Experimental Example B1 | Experimental Example B2 | Experimental Example B3 | Experimental Example B4 | Experimental Example B5 |
|---|---|---|---|---|---|---|
| Pen B1 | Standard deviation of $F_k$ | 5.0 | 6.6 | 12.6 | 11.5 | 10.8 |
| | $F_{re}$ on average (gf) | 10.0 | 9.8 | 13.4 | 13.0 | 15.8 |
| | $F_k$ on average | 13.0 | 15.0 | 25.9 | 21.6 | 23.8 |
| | Writing feeling | AA | AA | C | C | C |
| | Nib wear | A | A | C | C | A |

TABLE 3-continued

|  |  | Experimental Example B1 | Experimental Example B2 | Experimental Example B3 | Experimental Example B4 | Experimental Example B5 |
|---|---|---|---|---|---|---|
| Pen B2 | Standard deviation of $F_k$ | 7.0 | 8.7 | 18.3 | 6.8 | 8.2 |
|  | $F_{re}$ on average (gf) | 10.0 | 8.8 | 15.7 | 15.2 | 5.9 |
|  | $F_k$ on average | 10.0 | 11.0 | 22.2 | 14.7 | 8.3 |
|  | Writing feeling | AA | A | C | C | B |
|  | Nib wear | A | A | C | C | A |
| Pen B3 | Standard deviation of $F_k$ | 6.0 | 7.3 | 13.0 | 11.8 | 7.7 |
|  | $F_{re}$ on average (gf) | 5.3 | 7.1 | 3.7 | 12.9 | 1.6 |
|  | Fk on average | 10.0 | 25.2 | 18.3 | 19.5 | 25.1 |
|  | Writing feeling | B | B | C | C | C |
|  | Nib wear | A | A | B | C | A |
| Pen B4 | Standard deviation of $F_k$ | 5.0 | 4.5 | 9.9 | 5.3 | 8.3 |
|  | $F_{re}$ on average (gf) | 6.0 | 3.5 | 2.6 | 8.3 | 3.2 |
|  | $F_k$ on average | 9.0 | 9.3 | 19.0 | 15.0 | 17.2 |
|  | Writing feeling | B | C | C | A | C |
|  | Nib wear | A | A | B | B | A |
| Rt (μm) |  | 3.2 | 4.4 | 19.0 | 11.2 | 1.4 |
| θa (degrees) |  | 2.3 | 4.4 | 5.7 | 4.2 | 1.9 |
| λa (μm) |  | 82 | 62 | 197 | 214 | 91 |
| Area ratio of particles (%) |  | 20.2 | 28.5 | 39.2 | 12.6 | 16.5 |
| Particle density of 100 μm square (the number of particles/100 μm square) |  | 1.22 | 0.94 | 0.09 | 0.06 | 0.65 |
| λa/particle density |  | 67 | 66 | 2189 | 3567 | 140 |
| Martens' hardness (N/mm²) |  | 163 | 220 | 450 | 180 | 160 |
| Haze (%) |  | 51.2 | 55.8 | 41.7 | 22.1 | 4.6 |
| Total light transmittance (%) |  | 89.2 | 89.3 | 90.2 | 89.4 | 80.0 |
| Pencil hardness |  | 2H | 6H | 6H | F | H |

As shown in Table 3, a writing sheet that had a $F_k$ standard deviation of 3.0 gf or more and 11.0 gf or less and exhibited a $F_{re}$ value of 4.5 gf or more and 15.0 gf or less on average was given B or higher in the evaluation of writing feeling. This indicates that the selection of a writing sheet that satisfies the conditions (B1) and (B2) leads to the selection of a writing sheet that offers favorable writing feeling. Since the pens B1 to B4 all differ in type, the results of Table 3 indicate that even if any touch panel pen is used, the selection of a writing sheet that satisfies the conditions (B1) and (B2) leads to the selection of a writing sheet that offers favorable writing feeling.

From the results of Table 3, it can also be confirmed that the selection of a writing sheet that satisfies the conditions (B1) and (B2) tends to be able to suppress nib wear. In particular, a writing sheet that satisfies the conditions (B1) and (B2) and have physical properties (λa, etc.) in the suitable ranges described herein can be confirmed to be excellent in the suppression of nib wear.

From the results of Table 3, it can be further confirmed that the combination of a touch panel pen having a nib region constituted by a complex of fibers and a binder (pen B1 and pen B2) and a writing sheet having physical properties such as λa in the suitable ranges described herein is a combination effective for achieving favorable writing feeling.

B3. Preparation of Touch Panel

A conductive film of ITO having a thickness of 20 nm was formed by the sputtering method on the base material side of the writing sheet for a touch panel pen of each of Experimental Examples B1 to B5 to prepare an upper electrode plate. Subsequently, a conductive film of ITO having a thickness of approximately 20 nm was formed by the sputtering method on one side of a reinforced glass plate having a thickness of 1 mm to prepare a lower electrode plate. Subsequently, an application liquid for spacers containing an ionizing radiation-curable resin (Dot Cure TR5903; Taiyo Ink Mfg. Co., Ltd.) was printed in a dot pattern by the screen printing method on the surface having the conductive film in the lower electrode plate, and then irradiated with ultraviolet ray using a high-pressure mercury lamp to arrange spacers having a diameter of 50 μm and a height of 8 μm at 1-mm intervals.

Subsequently, the upper electrode plate and the lower electrode plate were placed such that their conductive films faced each other. The margins were bonded with a double-sided adhesive tape having a thickness of 30 μm and a width of 3 mm to prepare resistive touch panels of Experimental Examples B1 to B5.

As a result of writing with the touch panel pens B1 to B4 on the resistive touch panels of Experimental Examples B1 to B5, each touch panel pen produced evaluation results about writing feeling similar to those shown in Table 3. This result indicates that a touch panel system comprising a touch panel and a touch panel pen in combination offers favorable writing feeling provided that the touch panel system satisfies the conditions (B1) and (B2)

Each of the resistive touch panels of Experimental Examples B1 to B5 was placed on a commercially available ultra-high-resolution liquid-crystal display device (smartphone manufactured by Sharp Corp., trade name: SH-03G, pixel density: 480 ppi), and images were visually evaluated. As a result, the touch panels of Experimental Examples B1 to B3 were able to suppress scintillation. In particular, the touch panels of Experimental Examples B1 and B2 were excellent in the suppression of scintillation. On the other hand, the touch panels of Experimental Examples B4 and B5 exhibited conspicuous scintillation.

B4. Preparation of Display Device

The writing sheet for a touch panel pen of each of Experimental Examples B1 to B5 was laminated with a commercially available ultra-high-resolution liquid-crystal display device (smartphone manufactured by Sharp Corp., trade name: SH-03G, pixel density: 480 ppi) via a transparent pressure-sensitive adhesive to prepare display devices of Experimental Examples B1 to B5. For the lamination, the base material side of the writing sheet for a touch panel pen faced the display element side.

As a result of writing with the touch panel pens B1 to B4 on the display devices of Experimental Examples B1 to B5, each touch panel pen produced evaluation results about writing feeling similar to those shown in Table 3.

The images of display devices of Experimental Examples B1 to B5 were visually evaluated. As a result, the display devices of Experimental Examples B1 to B3 were able to suppress scintillation. In particular, the display devices of Experimental Examples B1 and B2 were excellent in the suppression of scintillation. On the other hand, the display devices of Experimental Examples B4 and B5 exhibited conspicuous scintillation.

INDUSTRIAL APPLICABILITY

The writing sheet for a touch panel pen, the touch panel, the touch panel system and the display device of the present invention are useful in achieving the favorable writing feeling of the touch panel pen. Also, the method for selecting a writing sheet for a touch panel pen according to the present invention is useful in achieving the efficient product design and quality control of writing sheets.

REFERENCE SIGNS LIST

1: Plastic film
2: Resin layer
10: Writing sheet for a touch panel pen
81: Touch panel pen
82: Movable mount
83: Weight
84: Holding fixture
85: Base

The invention claimed is:

1. A method for selecting a writing sheet for a touch panel pen, comprising selecting a sheet that satisfies the following conditions (B1) and (B2), as the writing sheet for a touch panel pen:
<condition (B1)>
the touch panel pen is fixed in contact at an angle of 60 degrees with the surface of the writing sheet for a touch panel pen; while a vertical load of 100 gf is applied to the touch panel pen, the writing sheet for a touch panel pen is moved 40 mm in one-way length at a rate of 14 mm/sec; friction force on the touch panel pen in the direction of the movement is measured at 0.001-second intervals to calculate kinetic friction force $F_k$; and when a standard deviation of the $F_k$ is calculated, the standard deviation is 3.0 gf or more and 11.0 gf or less; and
<condition (B2)>
after the completion of the movement of 40 mm in one-way length of the writing sheet for a touch panel pen under the condition (B1), the vertical load of 100 gf applied to the touch panel pen is maintained, and the touch panel pen is kept in contact at an angle of 60 degrees with the surface of the writing sheet for a touch panel pen; in this state, friction force on the touch panel pen in the direction of the movement is regarded as residual friction force $F_{re}$; and when the $F_{re}$ is measured at 0.001 second-intervals, the $F_{re}$ is 4.5 gf or more and 15.0 gf or less on average.

2. The method for selecting a writing sheet for a touch panel pen according to claim 1, further comprising selecting a sheet that satisfies the following condition (B3), as the writing sheet for a touch panel pen:
<condition (B3)>
the $F_k$ is 7.0 gf or more and 25.0 gf or less on average.

3. A touch panel system comprising: a touch panel comprising a writing sheet for a touch panel pen on a surface; and a touch panel pen, wherein the touch panel system satisfies the following conditions (B1) and (B2):
<condition (B1)>
the touch panel pen is fixed in contact at an angle of 60 degrees with the surface of the writing sheet for a touch panel pen; while a vertical load of 100 gf is applied to the touch panel pen, the writing sheet for a touch panel pen is moved 40 mm in one-way length at a rate of 14 mm/sec; friction force on the touch panel pen in the direction of the movement is measured at 0.001-second intervals to calculate kinetic friction force $F_k$; and when a standard deviation of the $F_k$ is calculated, the standard deviation is 3.0 gf or more and 11.0 gf or less; and
<condition (B2)>
after the completion of the movement of 40 mm in one-way length of the writing sheet for a touch panel pen under the condition (B1), the vertical load of 100 gf applied to the touch panel pen is maintained, and the touch panel pen is kept in contact at an angle of 60 degrees with the surface of the writing sheet for a touch panel pen; in this state, friction force on the touch panel pen in the direction of the movement is regarded as residual friction force $F_{re}$; and when the $F_{re}$ is measured at 0.001 second-intervals, the $F_{re}$ is 4.5 gf or more and 15.0 gf or less on average.

4. A writing sheet for a touch panel pen having a surface that satisfies the following conditions (B1) and (B2):
<condition (B1)>
the touch panel pen is fixed in contact at an angle of 60 degrees with the surface of the writing sheet for a touch panel pen; while a vertical load of 100 gf is applied to the touch panel pen, the writing sheet for a touch panel pen is moved 40 mm in one-way length at a rate of 14 mm/sec; friction force on the touch panel pen in the direction of the movement is measured at 0.001-second intervals to calculate kinetic friction force $F_k$; and when a standard deviation of the $F_k$ is calculated, the standard deviation is 3.0 gf or more and 11.0 gf or less; and
<condition (B2)>
after the completion of the movement of 40 mm in one-way length of the writing sheet for a touch panel pen under the condition (B1), the vertical load of 100 gf applied to the touch panel pen is maintained, and the touch panel pen is kept in contact at an angle of 60 degrees with the surface of the writing sheet for a touch panel pen; in this state, friction force on the touch panel pen in the direction of the movement is regarded as residual friction force $F_{re}$; and when the $F_{re}$ is measured at 0.001 second-intervals, the $F_{re}$ is 4.5 gf or more and 15.0 gf or less on average.

5. A touch panel comprising a sheet on a surface, wherein a writing sheet for a touch panel pen according to claim 4 is placed as the sheet such that a side whose surface satisfies the conditions (B1) and (B2) is exposed.

6. A display device with a touch panel, the display device comprising the touch panel on a display element, wherein the touch panel is a touch panel according to claim 5.

* * * * *